US012254819B2

(12) United States Patent
Kwon et al.

(10) Patent No.: US 12,254,819 B2
(45) Date of Patent: Mar. 18, 2025

(54) DISPLAY PANEL AND DISPLAY DEVICE INCLUDING THE SAME

(71) Applicant: LG Display Co., Ltd., Seoul (KR)

(72) Inventors: Ki Tae Kwon, Paju-si (KR); Yong Won Jo, Paju-si (KR); Jong Wook Jang, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 5 days.

(21) Appl. No.: 18/369,038

(22) Filed: Sep. 15, 2023

(65) Prior Publication Data

US 2024/0177651 A1 May 30, 2024

(30) Foreign Application Priority Data

Nov. 24, 2022 (KR) ........................ 10-2022-0158835

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2320/0233* (2013.01); *G09G 2330/04* (2013.01)

(58) Field of Classification Search
CPC ............. G09G 3/32; G09G 2310/0267; G09G 2310/0275; G09G 2320/0233; G09G 2330/04
See application file for complete search history.

(56) References Cited

U.S. PATENT DOCUMENTS

| | | | | |
|---|---|---|---|---|
| 2018/0332276 A1* | 11/2018 | Hayashi | ................. | H04N 25/75 |
| 2020/0090563 A1* | 3/2020 | Yen | .................... | G01R 31/3004 |

FOREIGN PATENT DOCUMENTS

| | | | |
|---|---|---|---|
| KR | 10-2021-0075431 A | 6/2021 | |
| KR | 10-2021-0081567 A | 7/2021 | |
| KR | 10-2021-0083818 A | 7/2021 | |

* cited by examiner

*Primary Examiner* — Amit Chatly
*Assistant Examiner* — Chayce R Bibbee
(74) *Attorney, Agent, or Firm* — Birch, Stewart, Kolasch & Birch, LLP

(57) ABSTRACT

A display panel can include a plurality of first pixel circuits configured to receive a pixel driving voltage and a reference voltage for displaying an image; and a plurality of second pixel circuits including a power line supplied with the pixel driving voltage and a reference voltage line supplied with the reference voltage, the plurality of second pixel circuits being configured to short-circuit the power line to the reference voltage line for at least some amount of time within a vertical blank period. Also, the plurality of second pixel circuits can maintain uniform luminance of the plurality of first pixel circuits.

23 Claims, 28 Drawing Sheets

【FIG. 1】
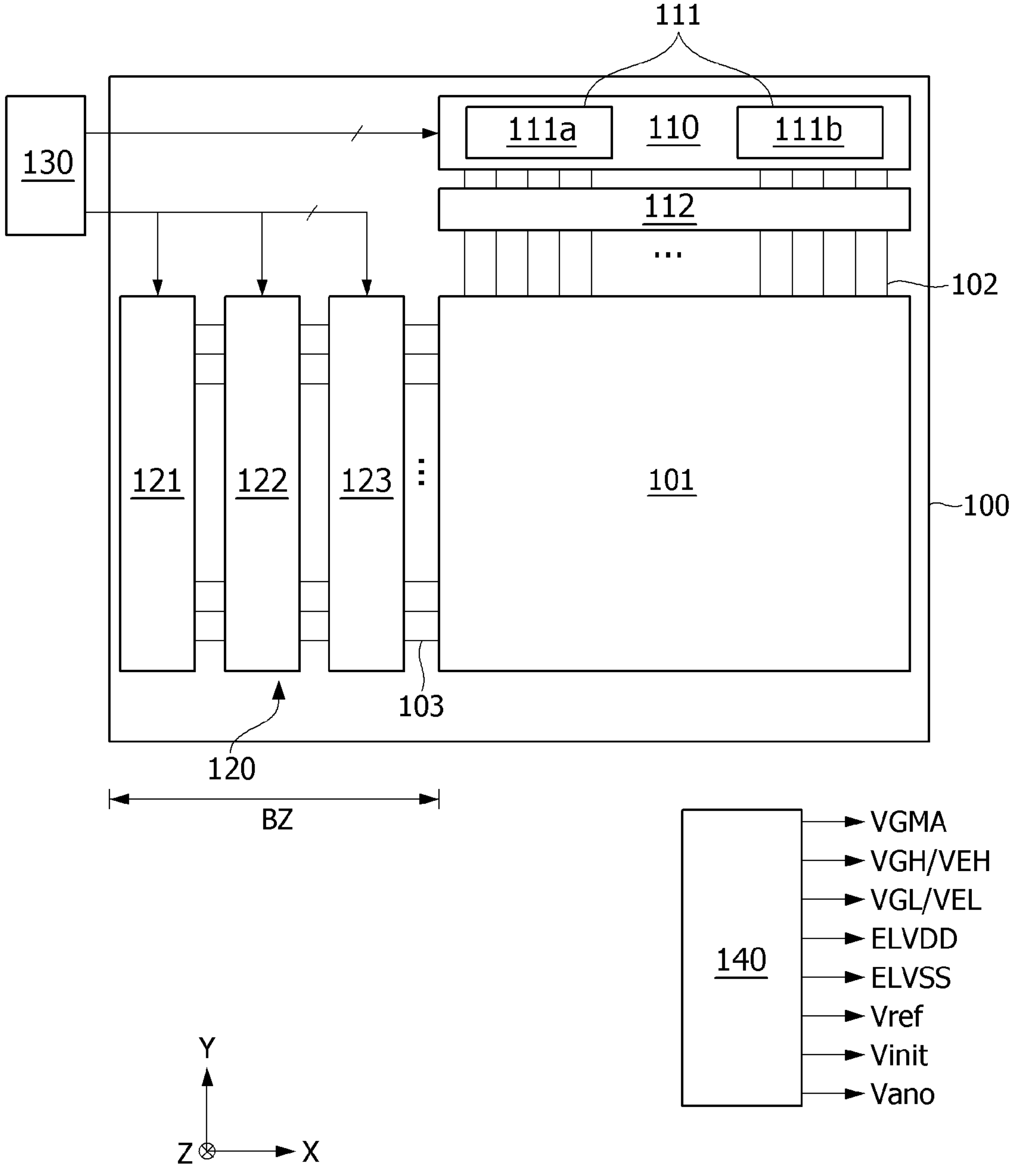

【FIG. 2】
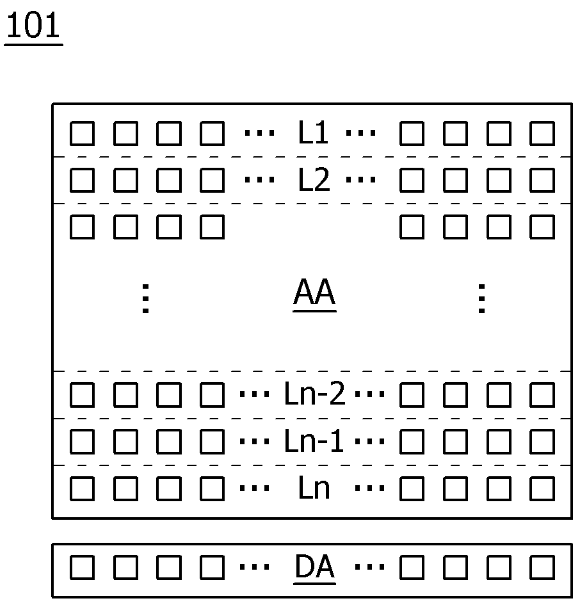
【FIG. 3】
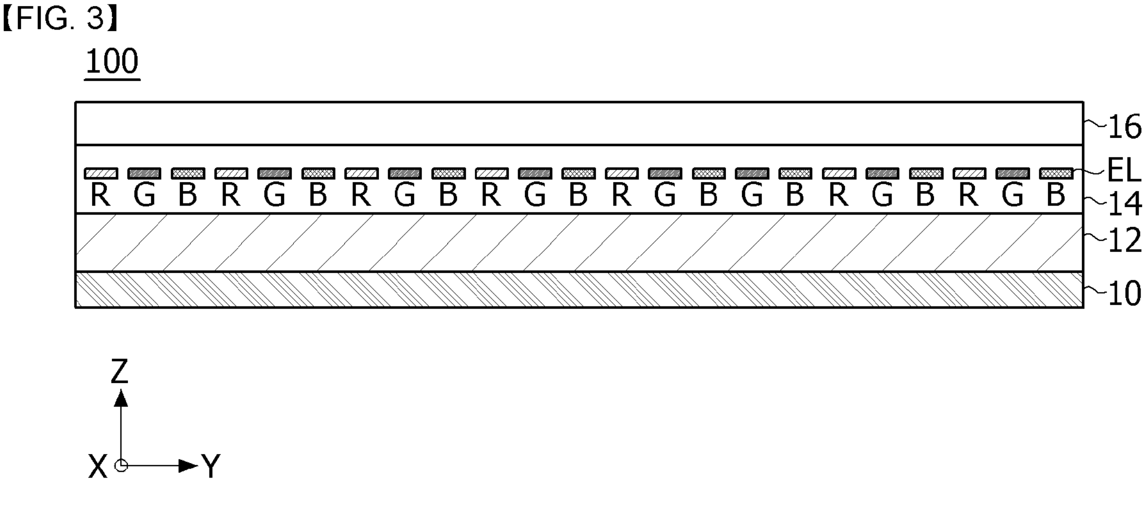

【FIG. 4】
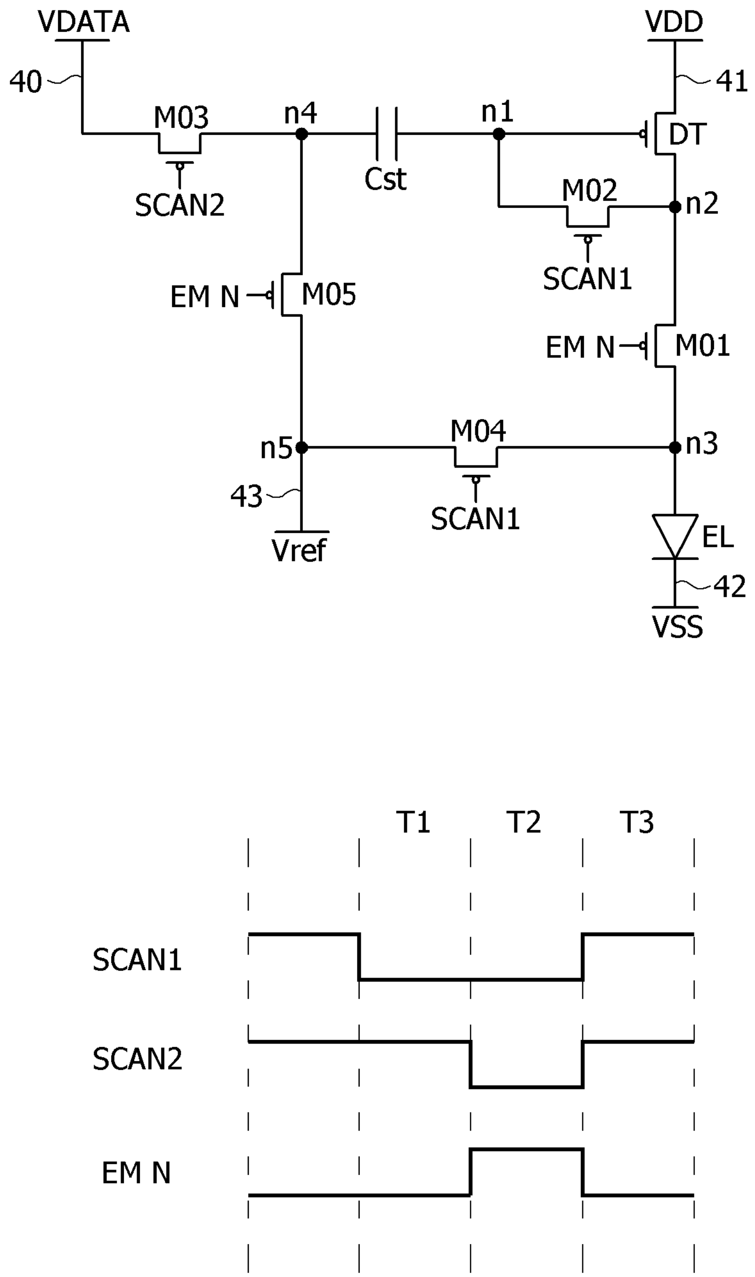

【FIG. 5A】
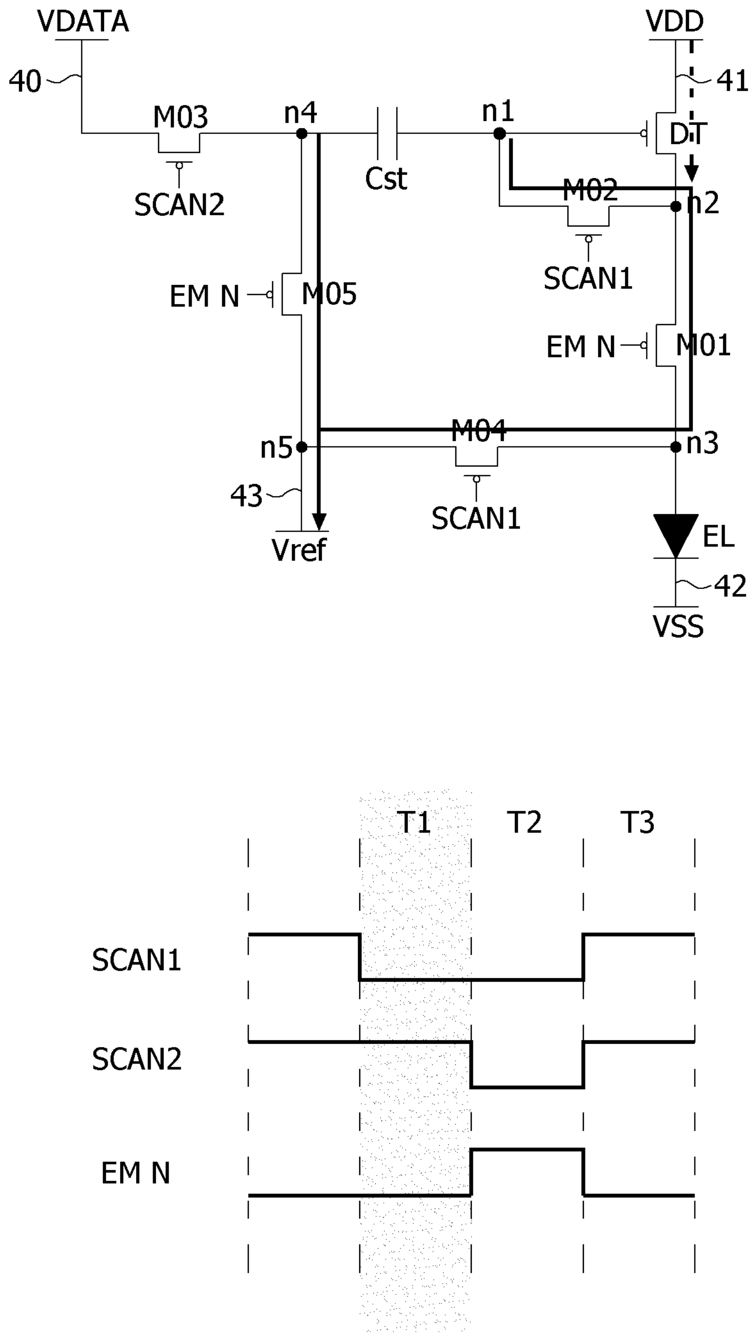

【FIG. 5B】
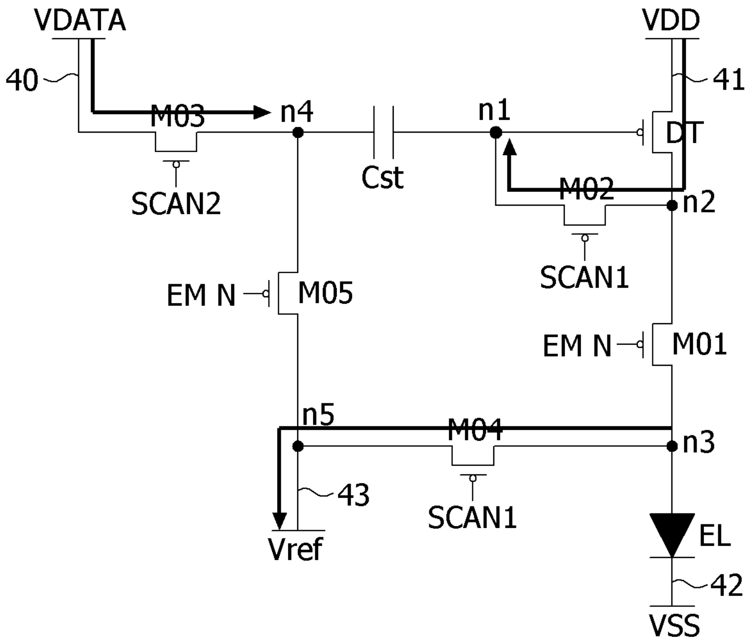
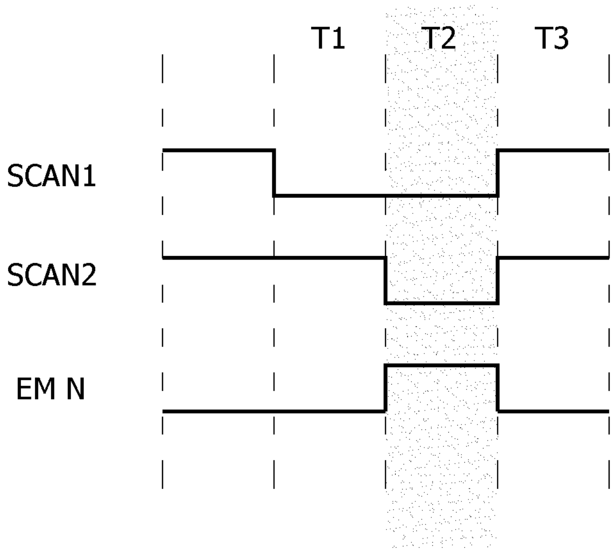

【FIG. 5C】
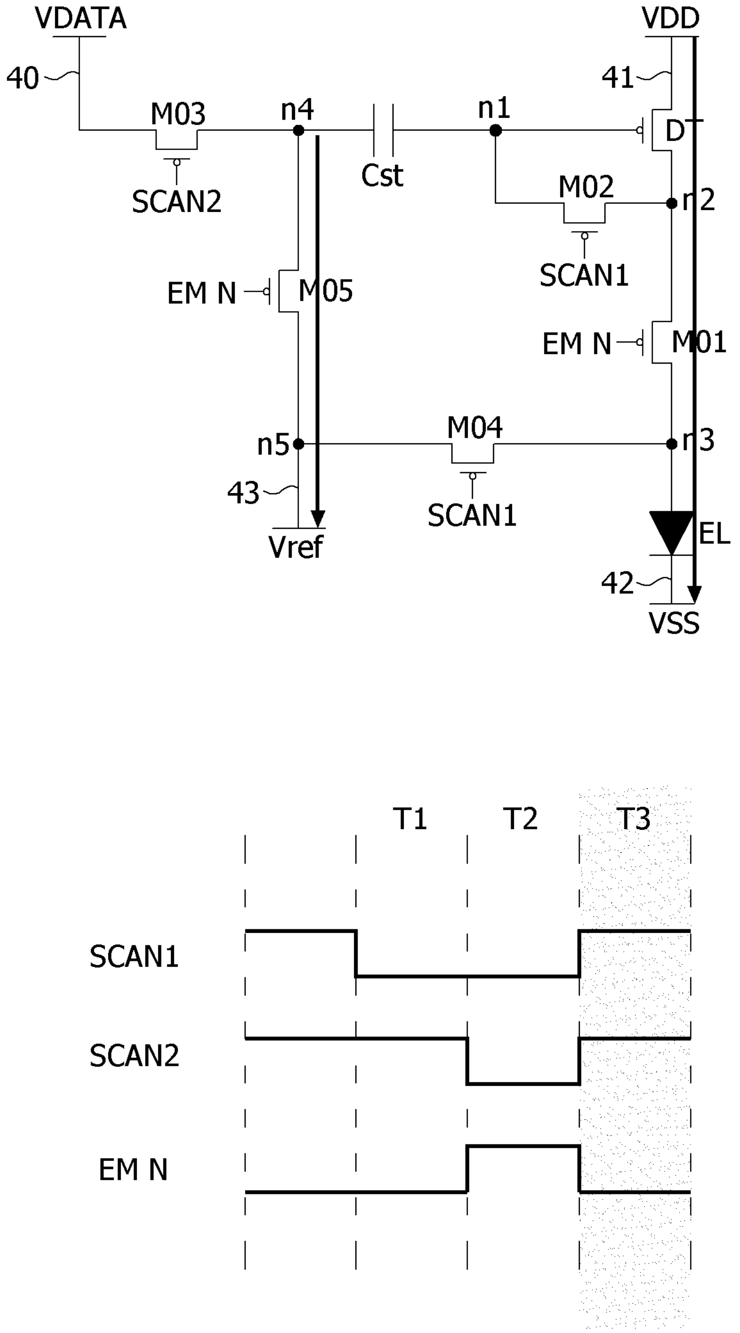

【FIG. 6】
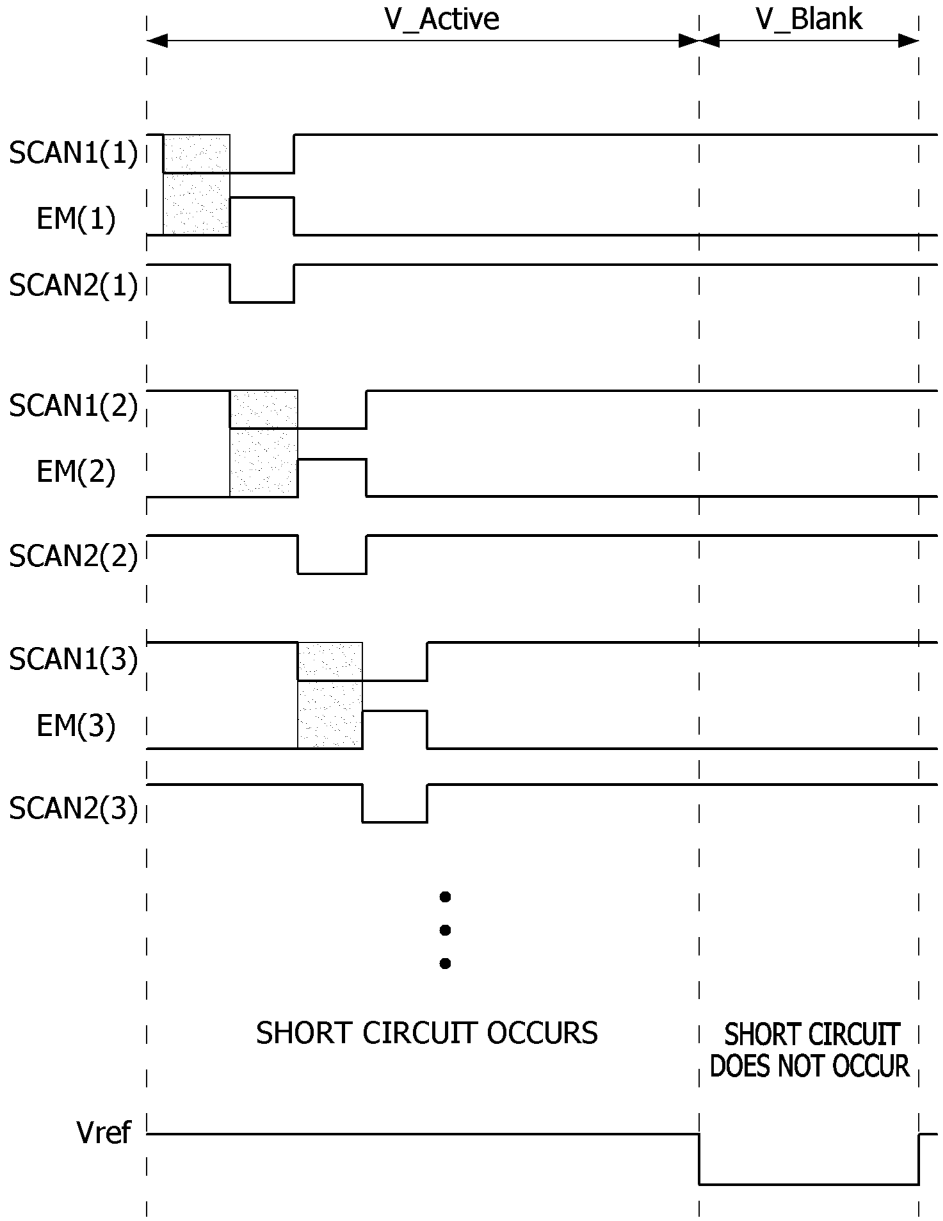

【FIG. 7A】
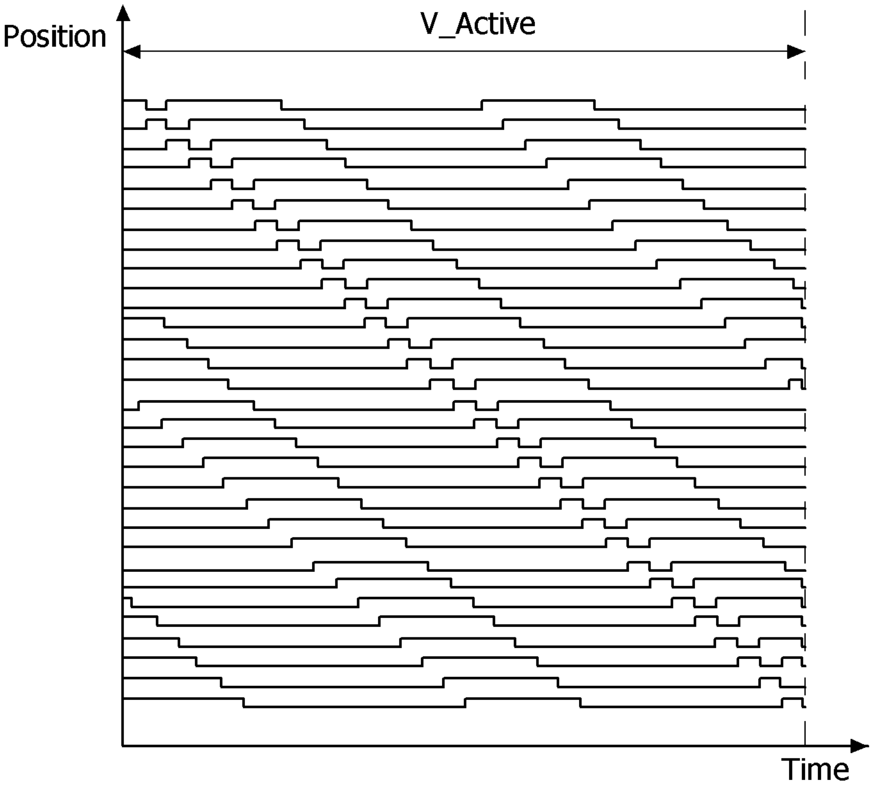

【FIG. 7B】
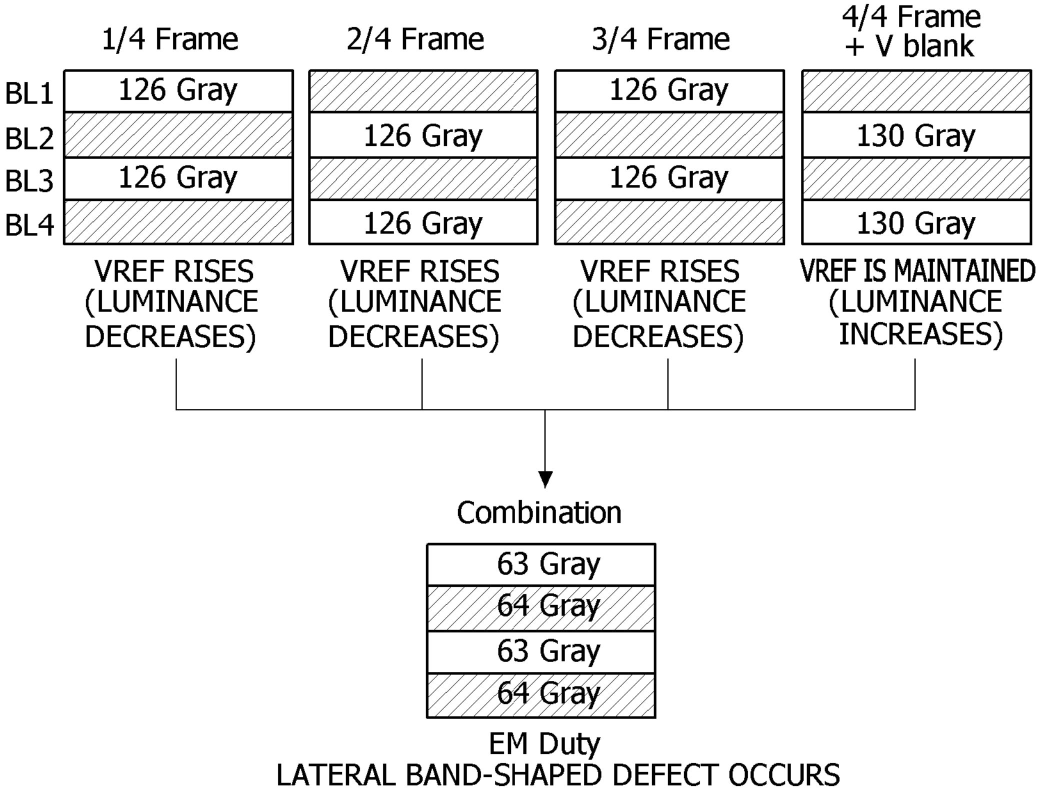

【FIG. 7C】
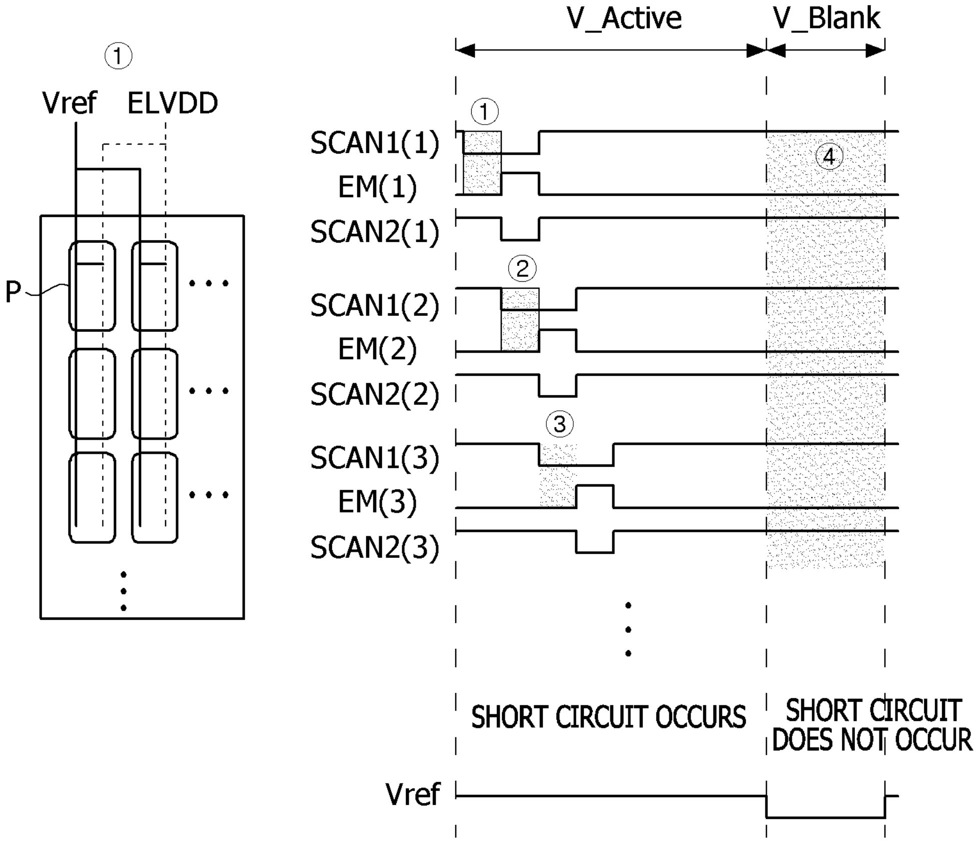

【FIG. 7D】
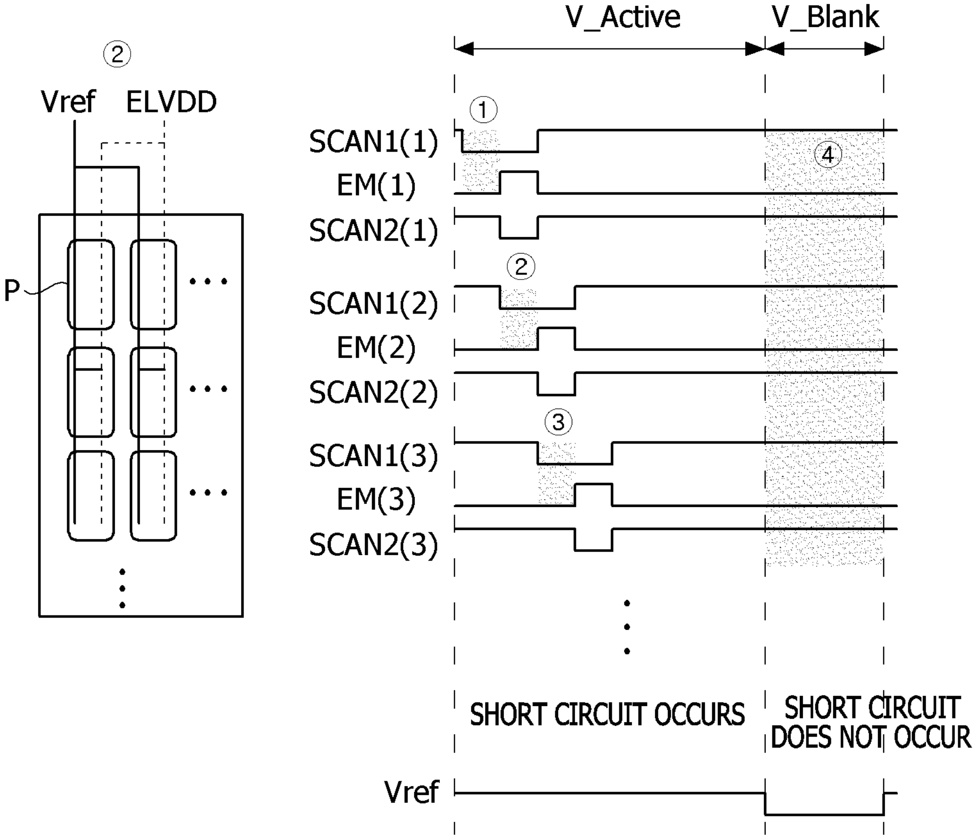

【FIG. 7E】
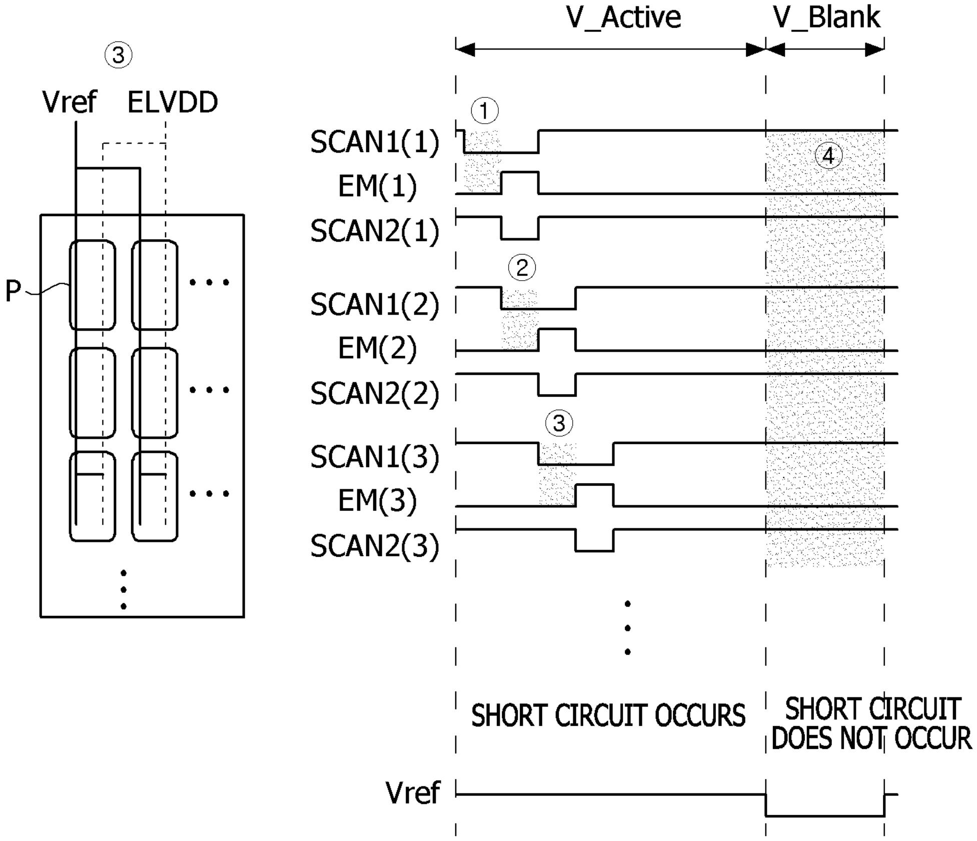

【FIG. 7F】
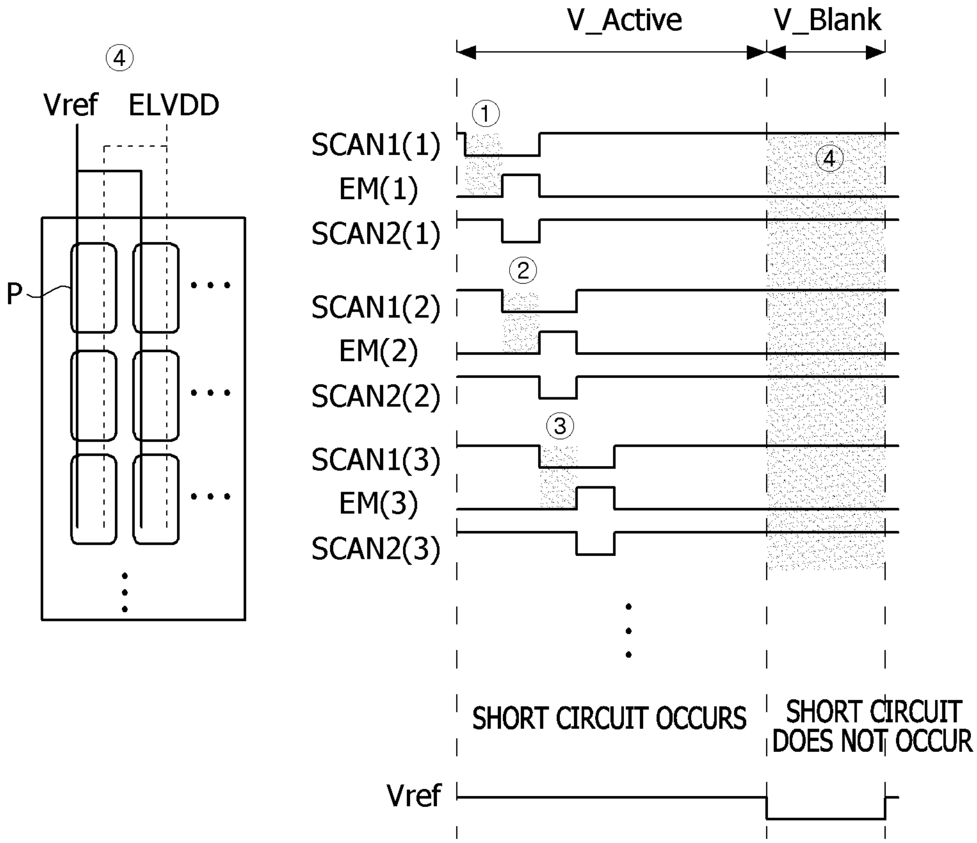

【FIG. 8】
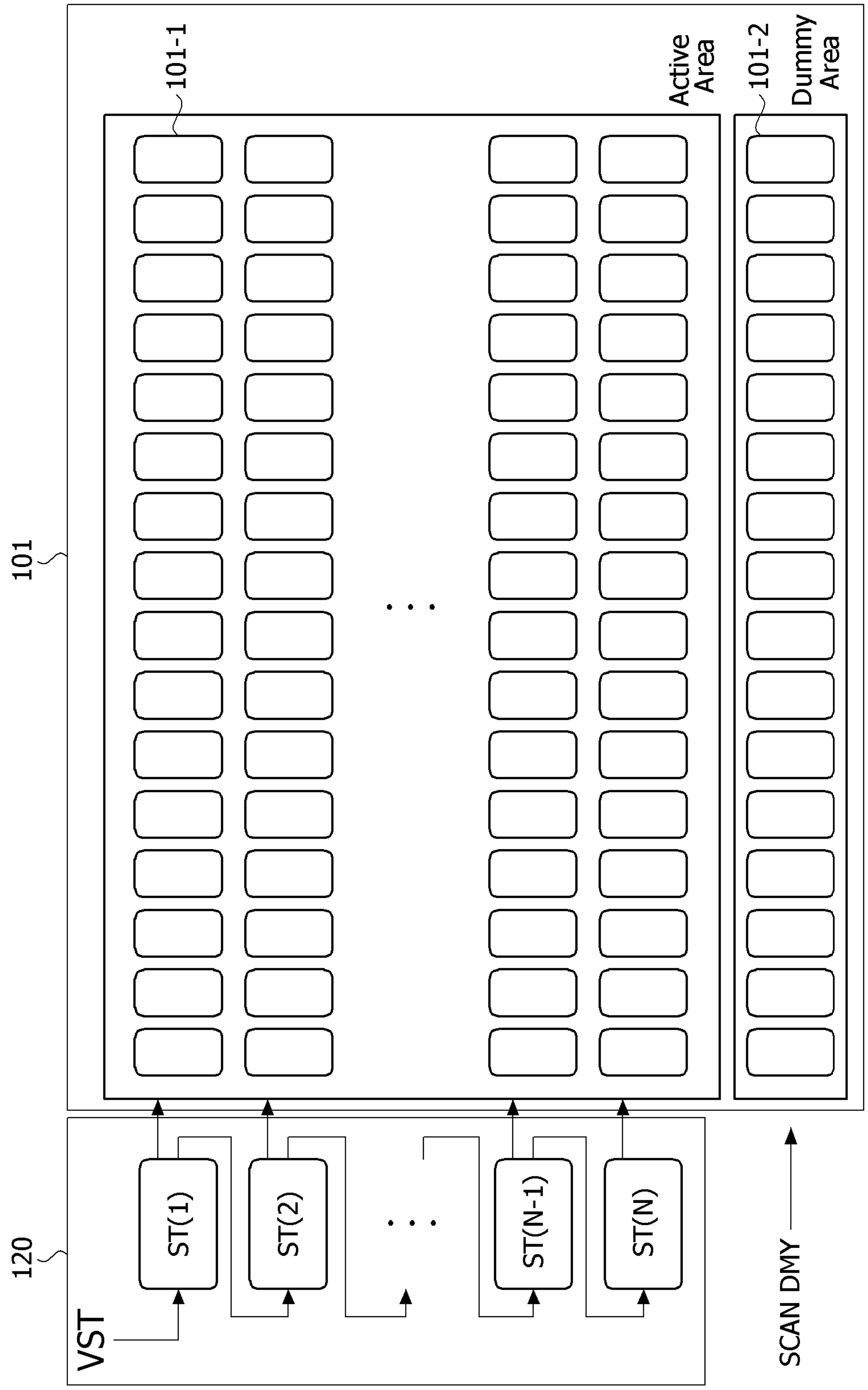

【FIG. 9】
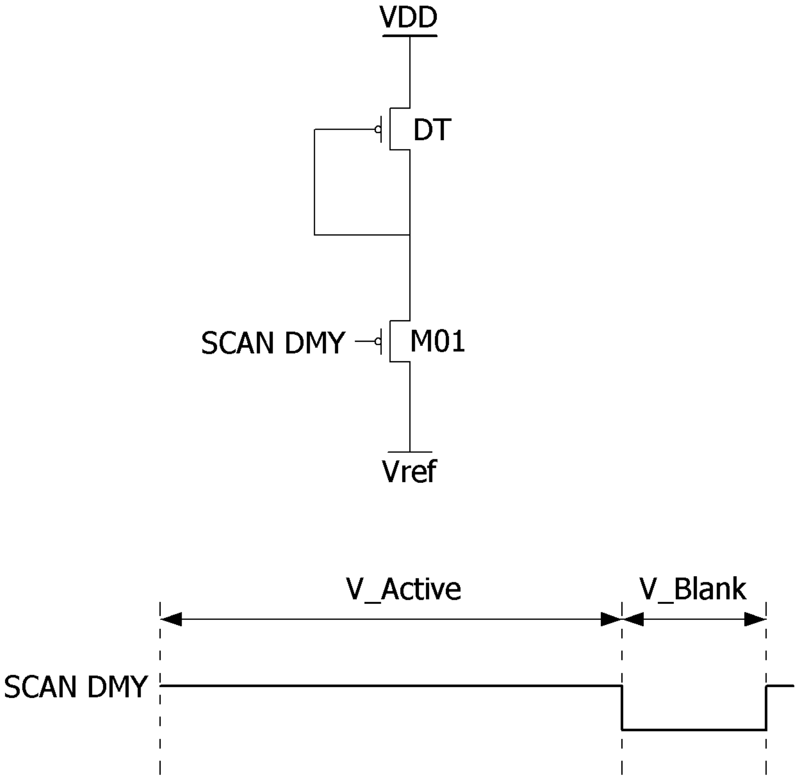

【FIG. 10A】
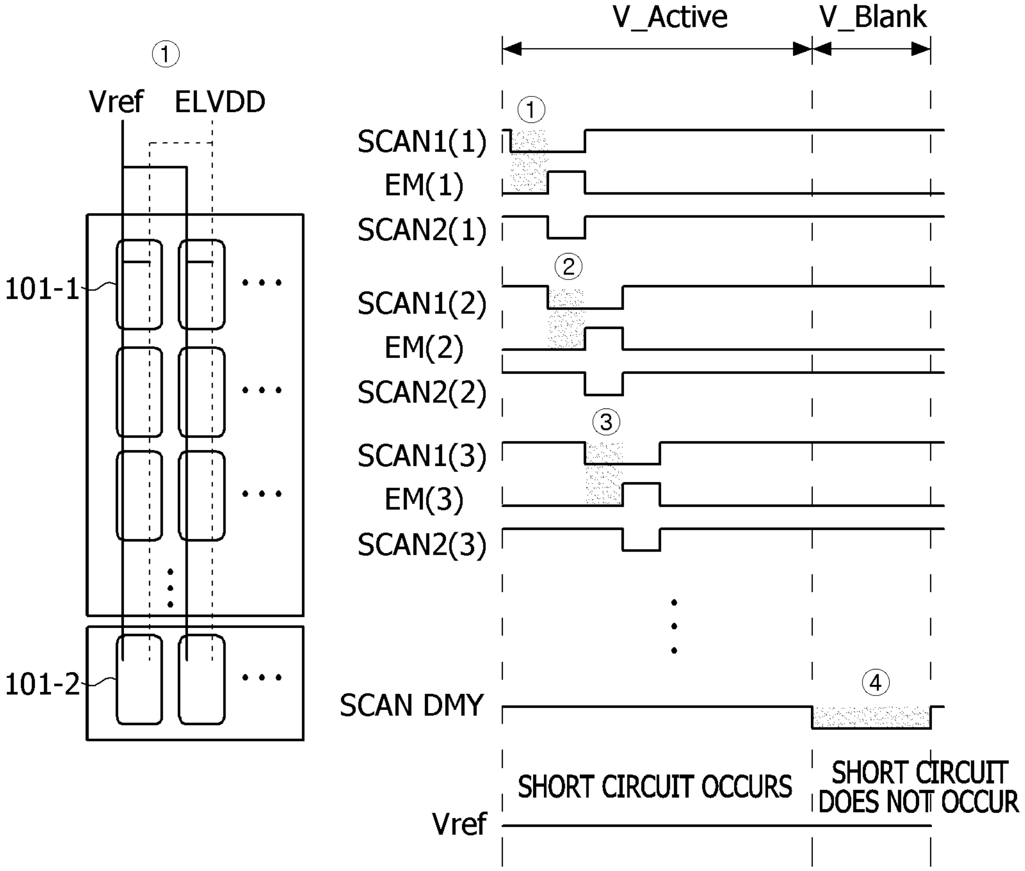

【FIG. 10B】
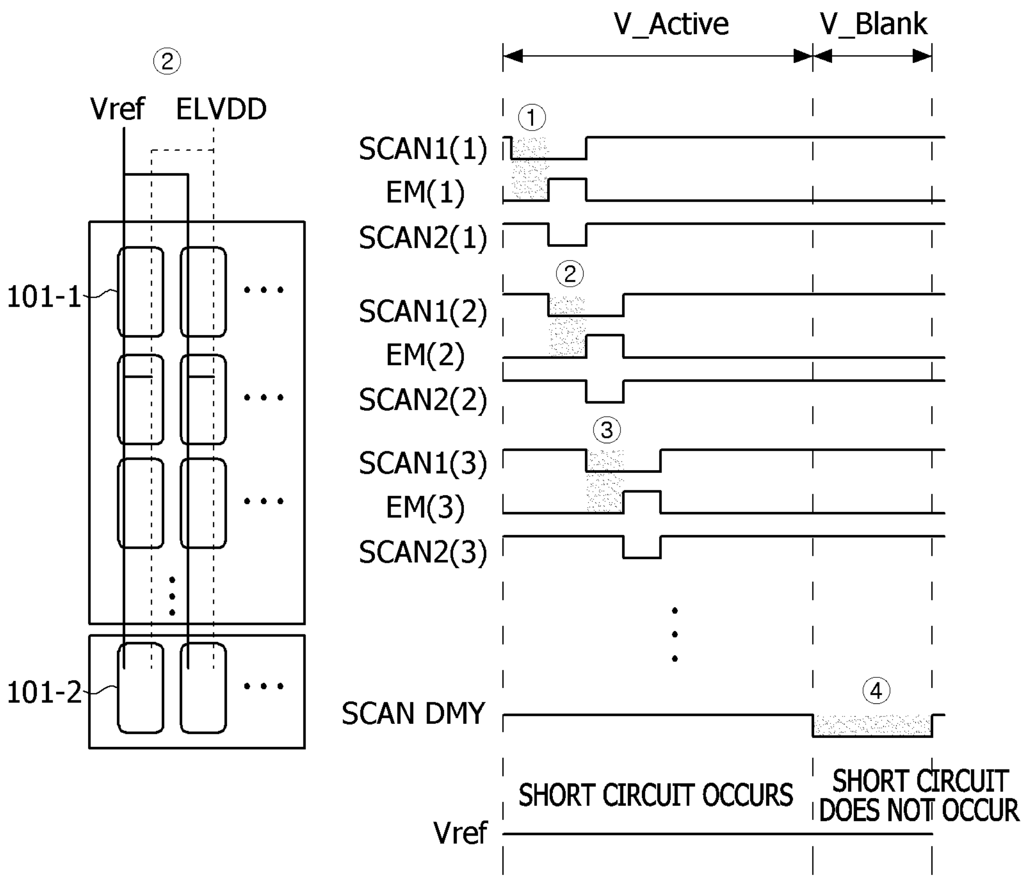

【FIG. 10C】
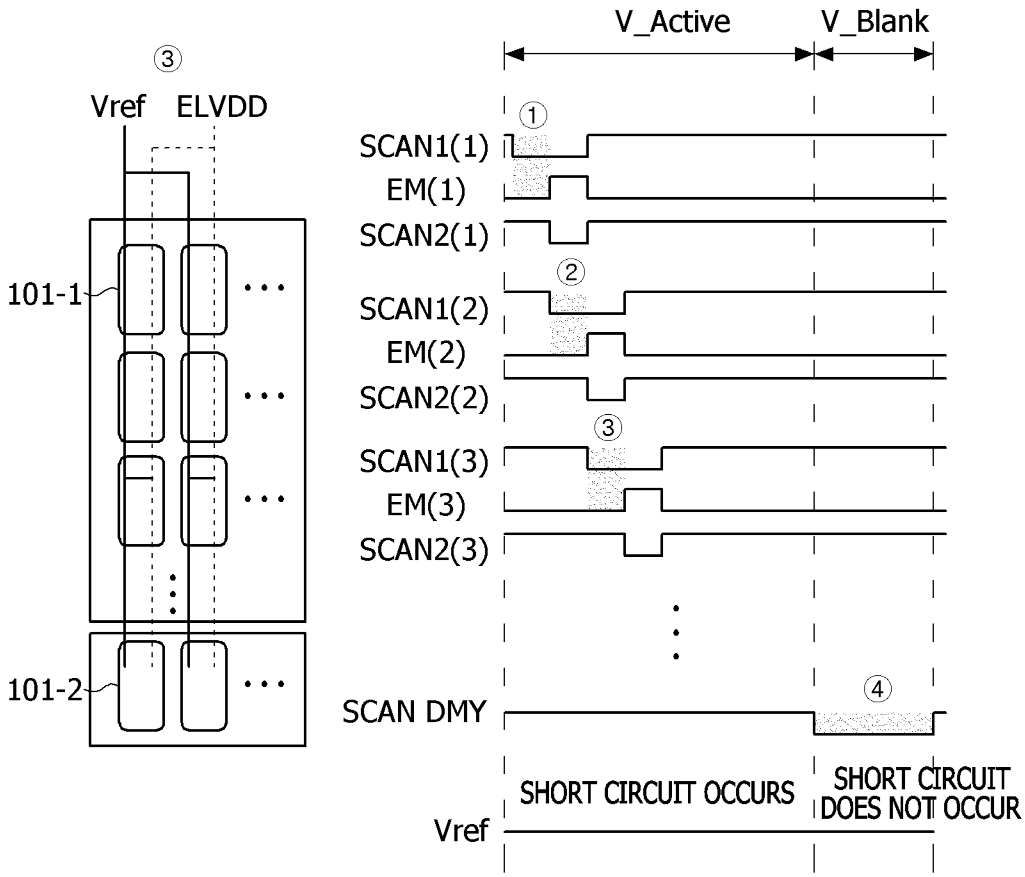

【FIG. 10D】
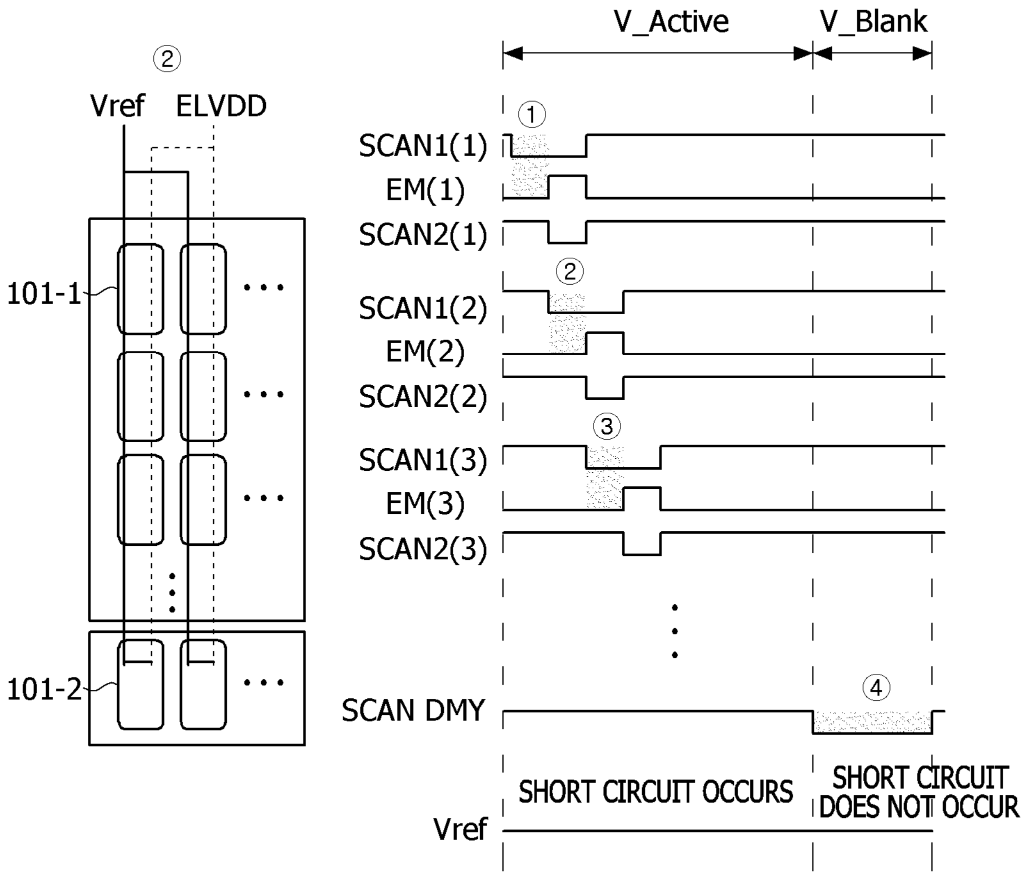

【FIG. 11】
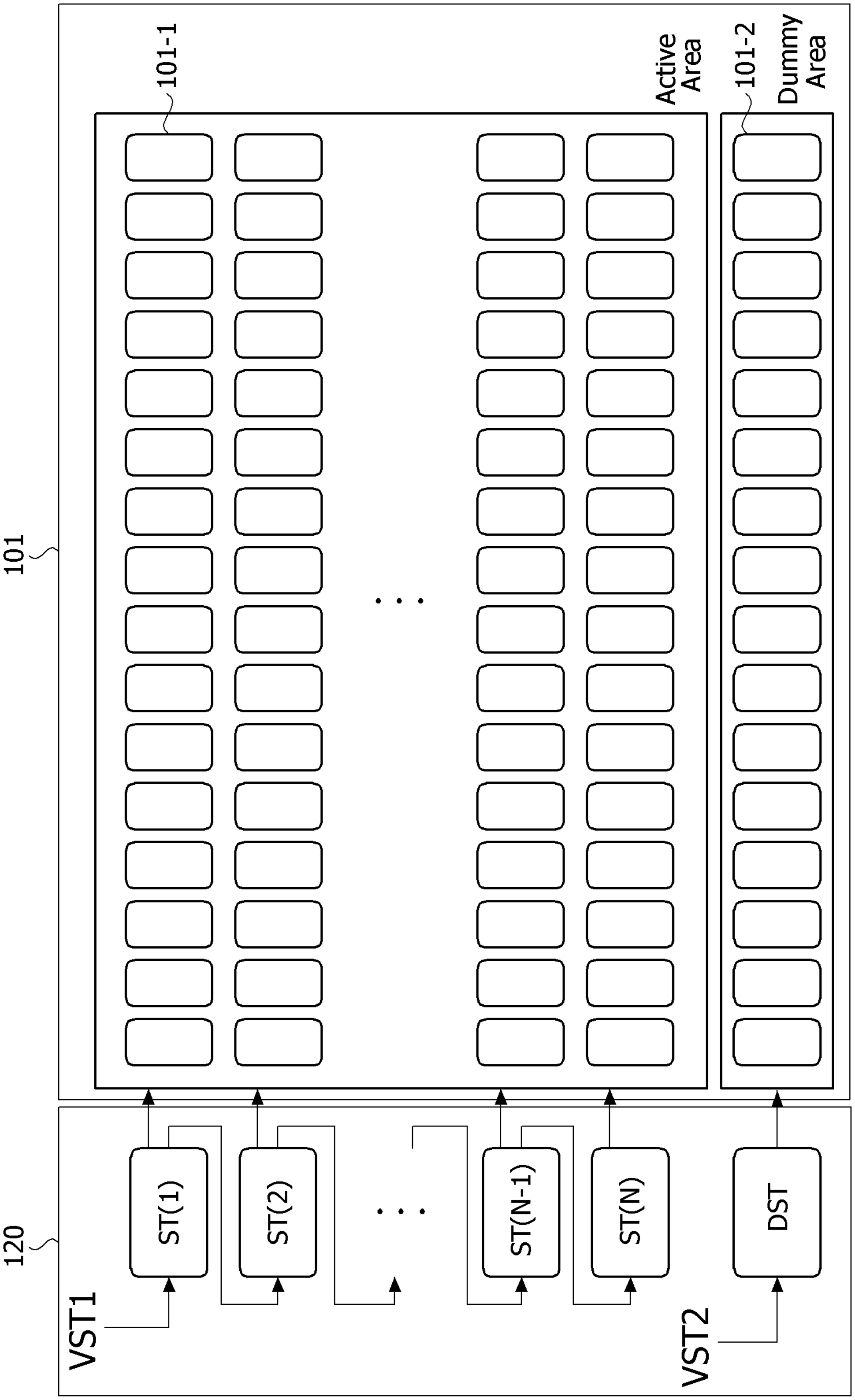

【FIG. 12】
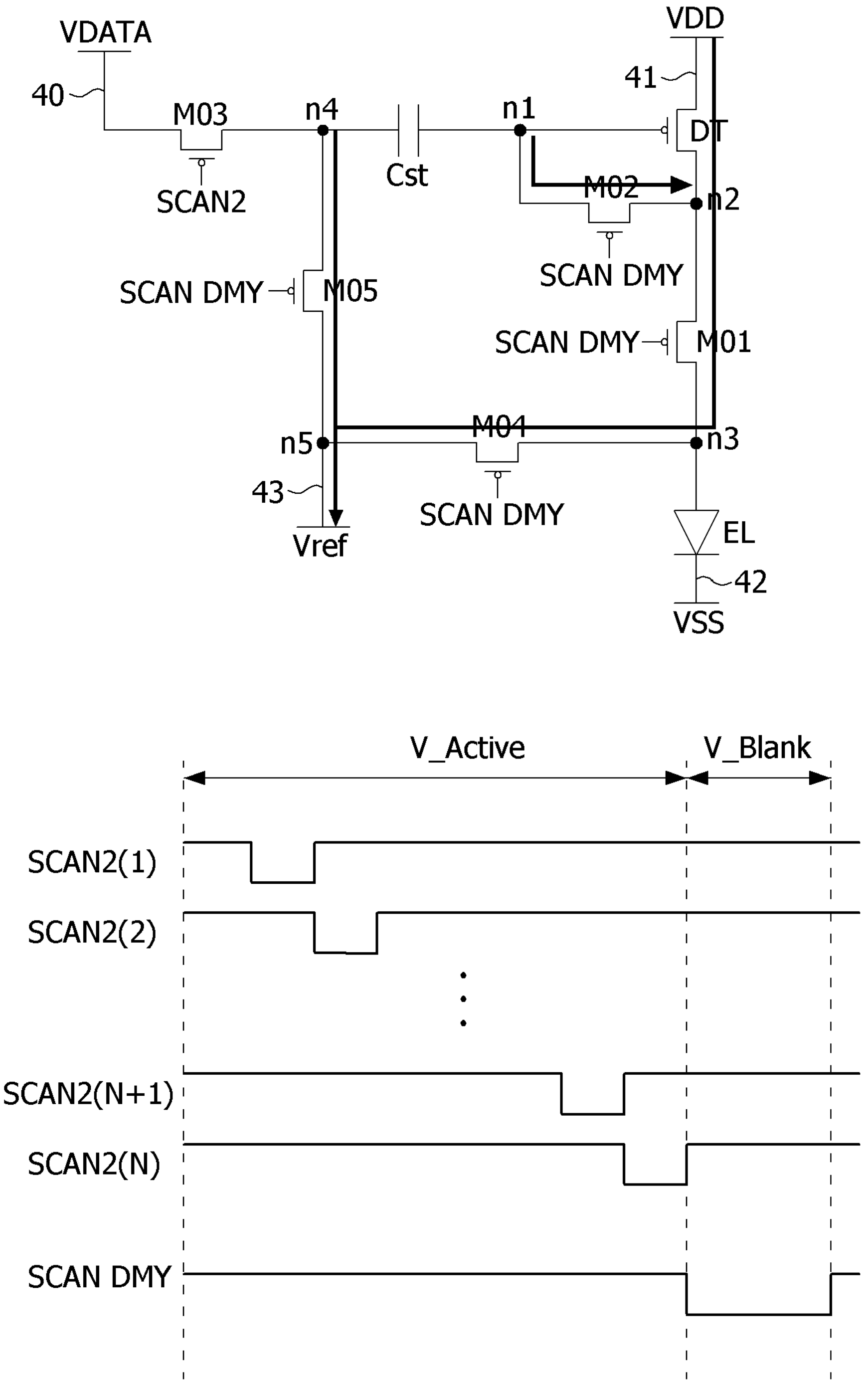

【FIG. 13】
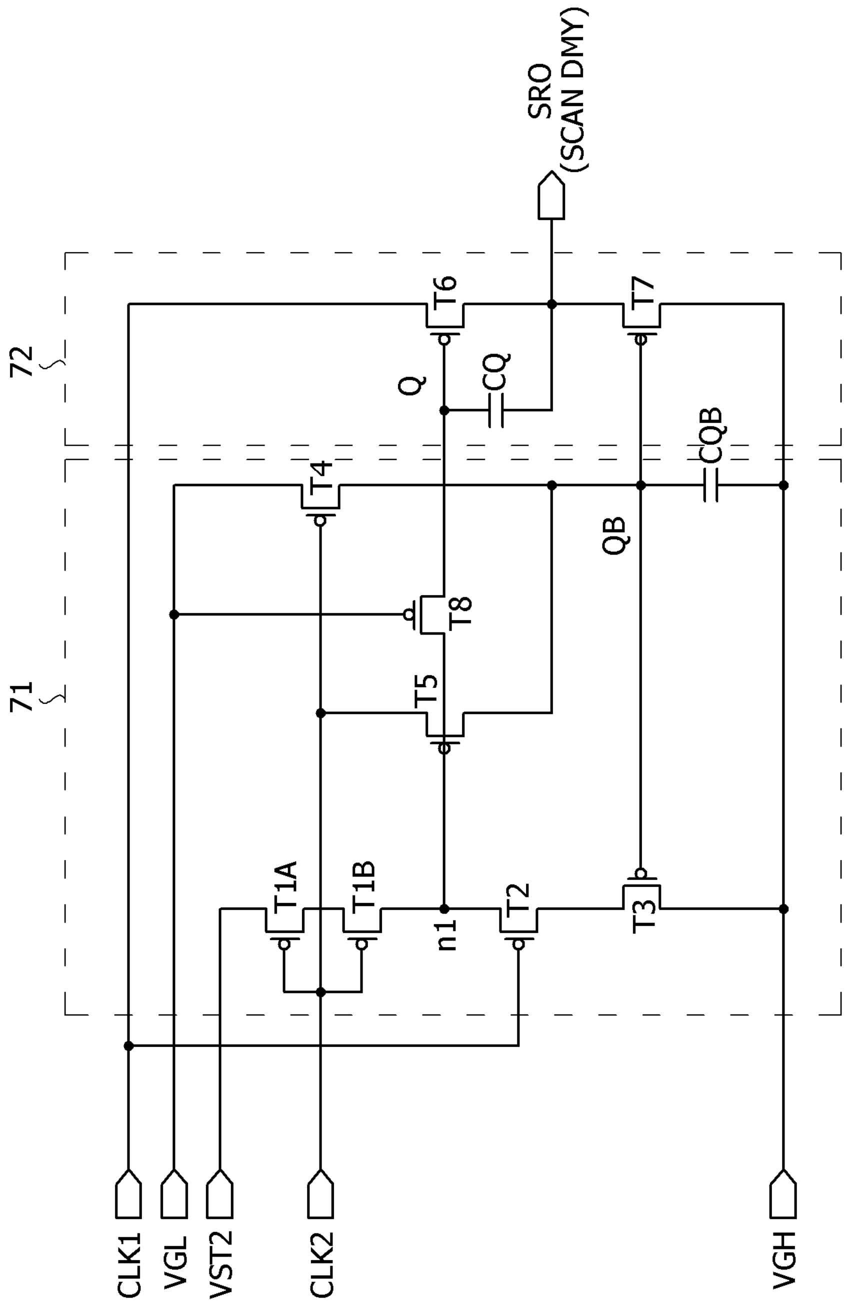

【FIG. 14】
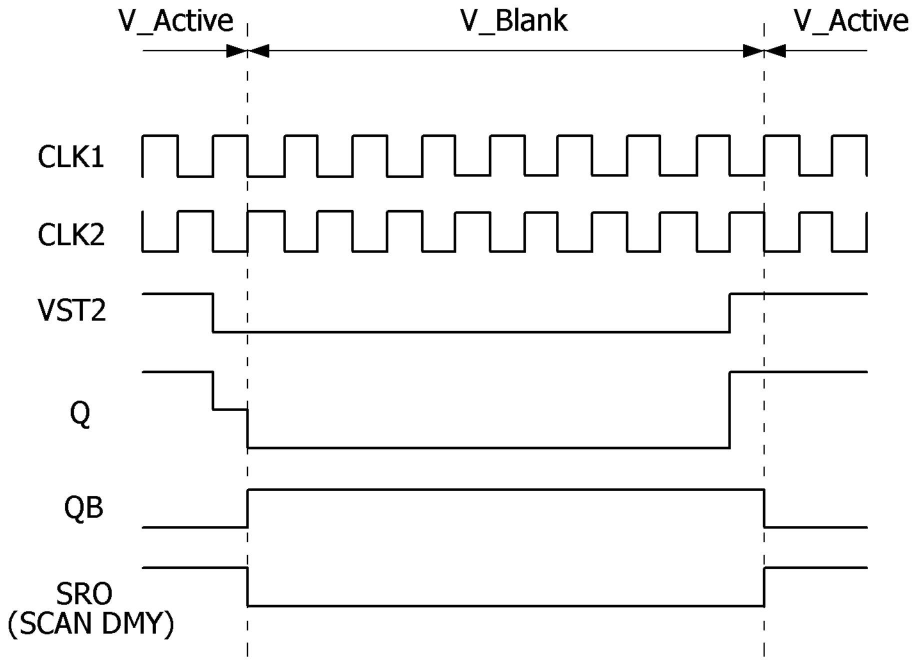

【FIG. 15】
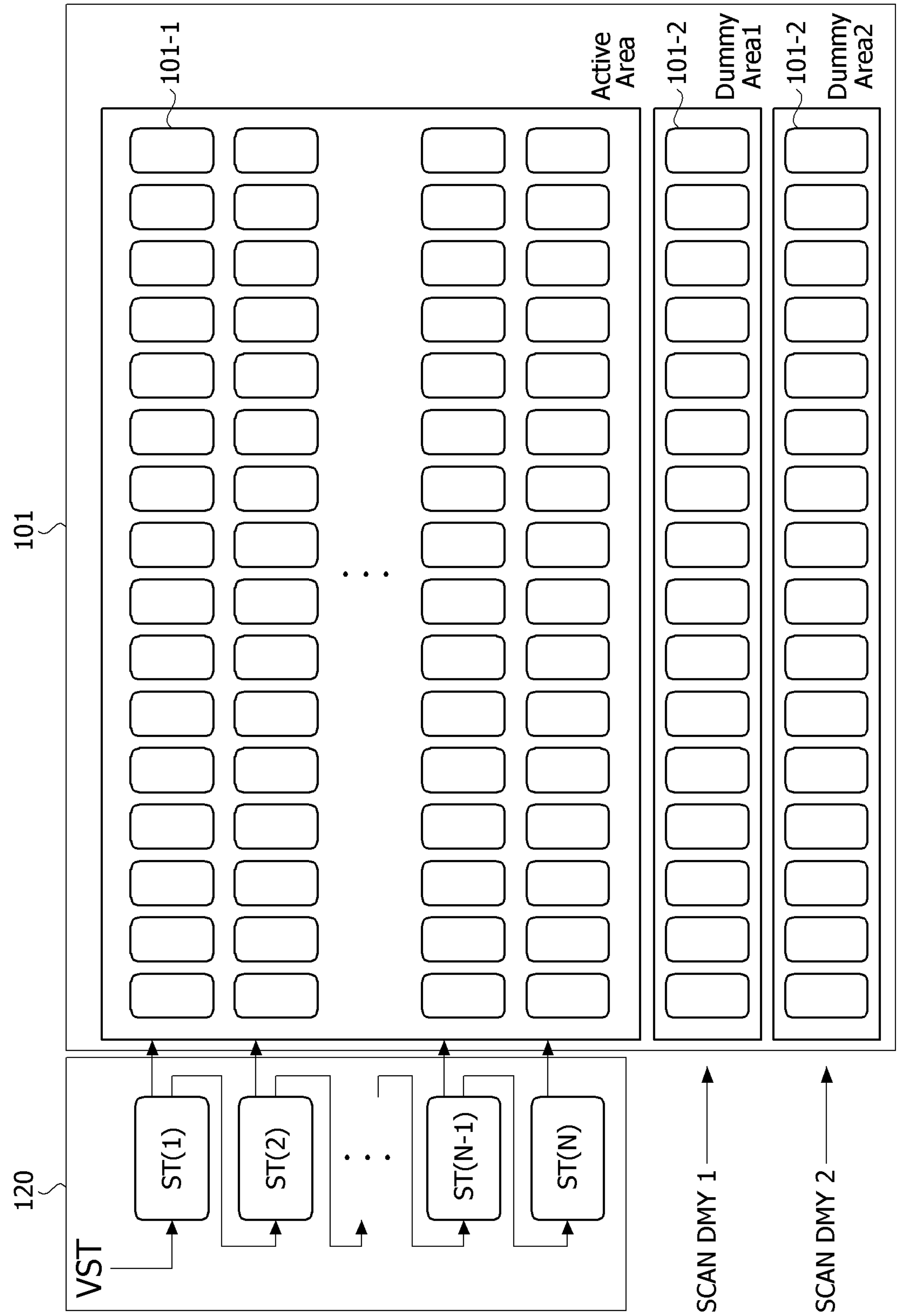

【FIG. 16】
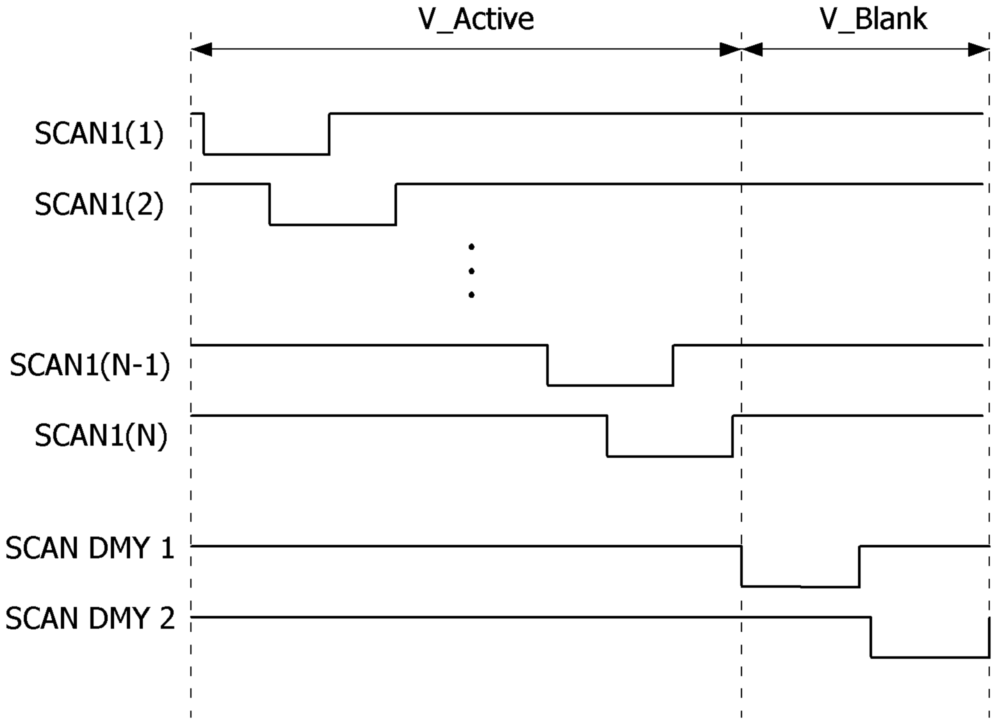

【FIG. 17】
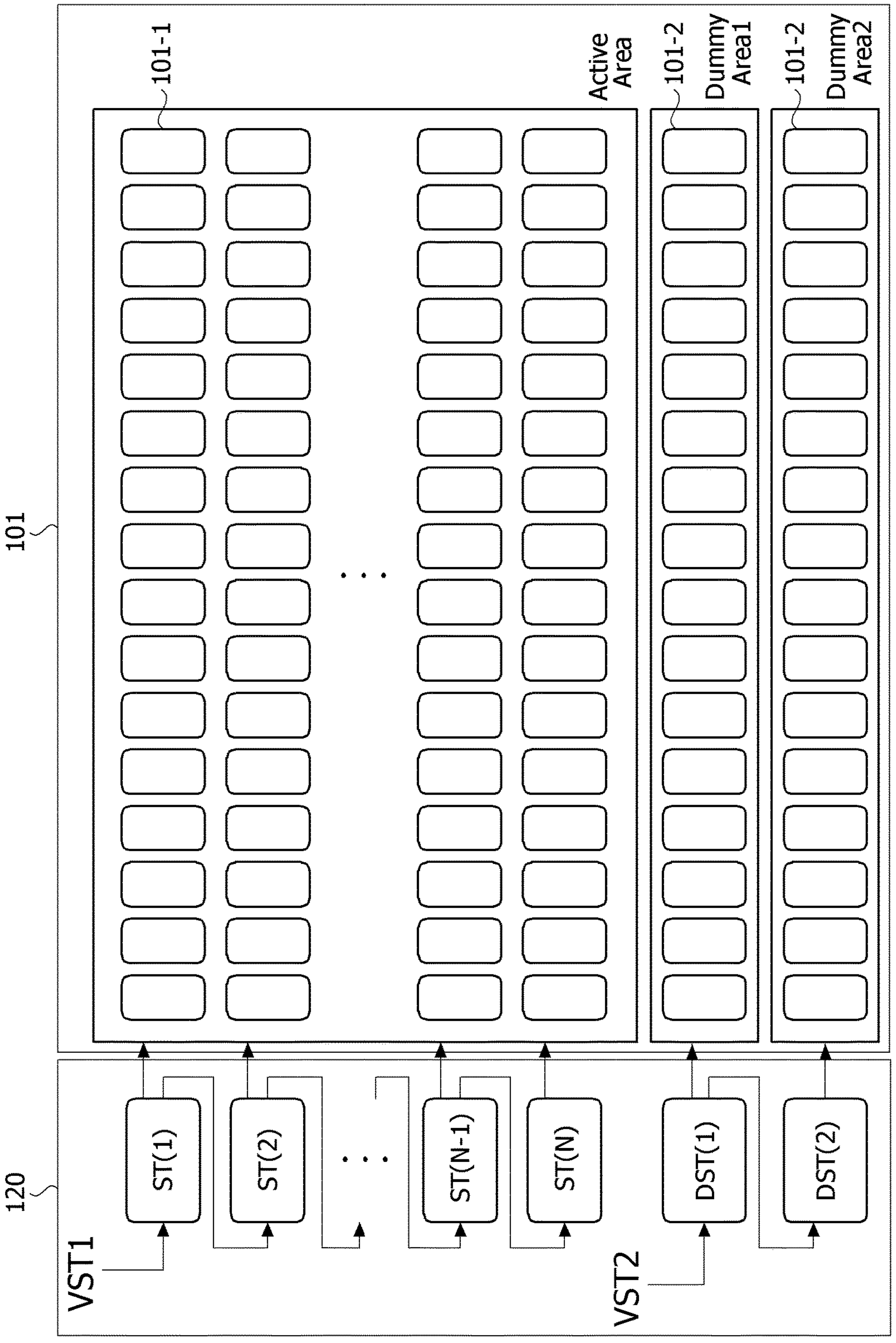

【FIG. 18】
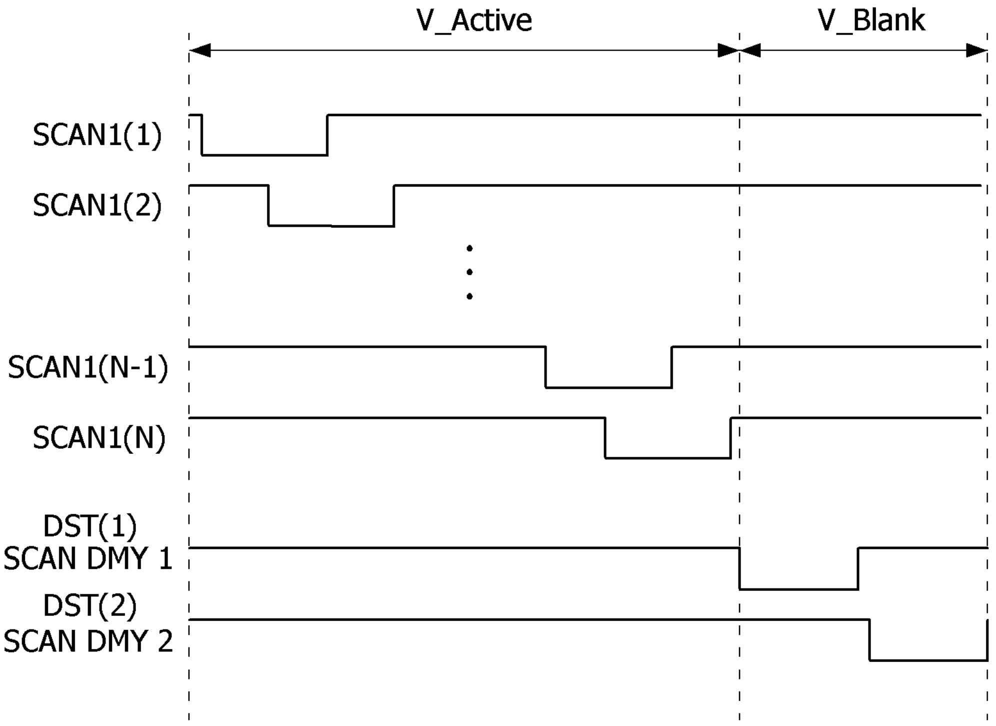
【FIG. 19A】
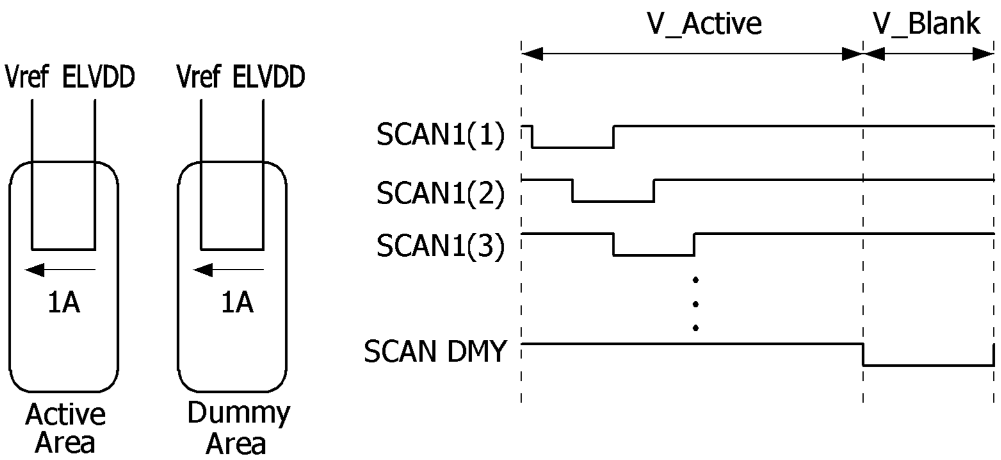

【FIG. 19B】
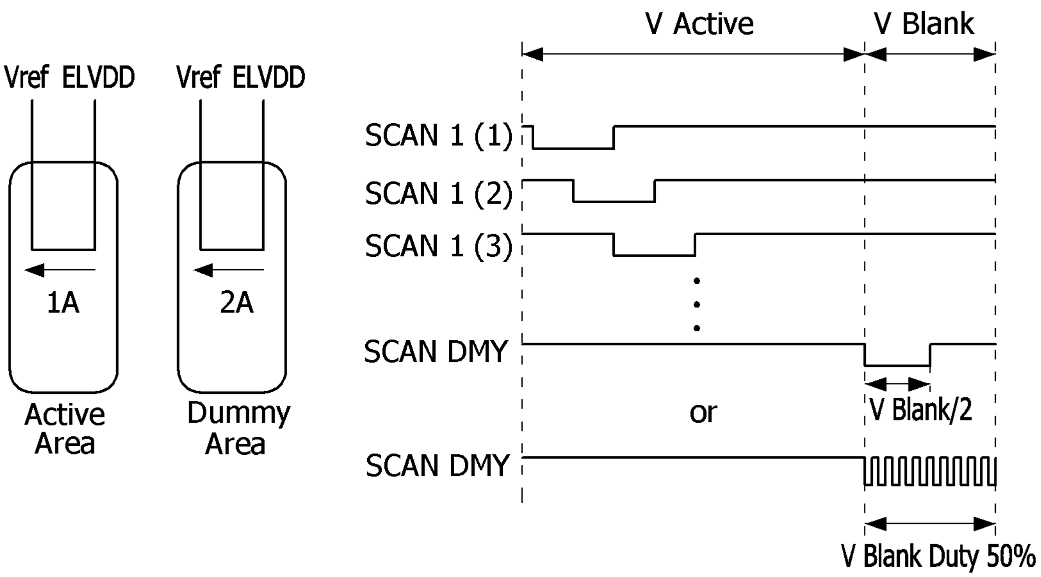
【FIG. 19C】
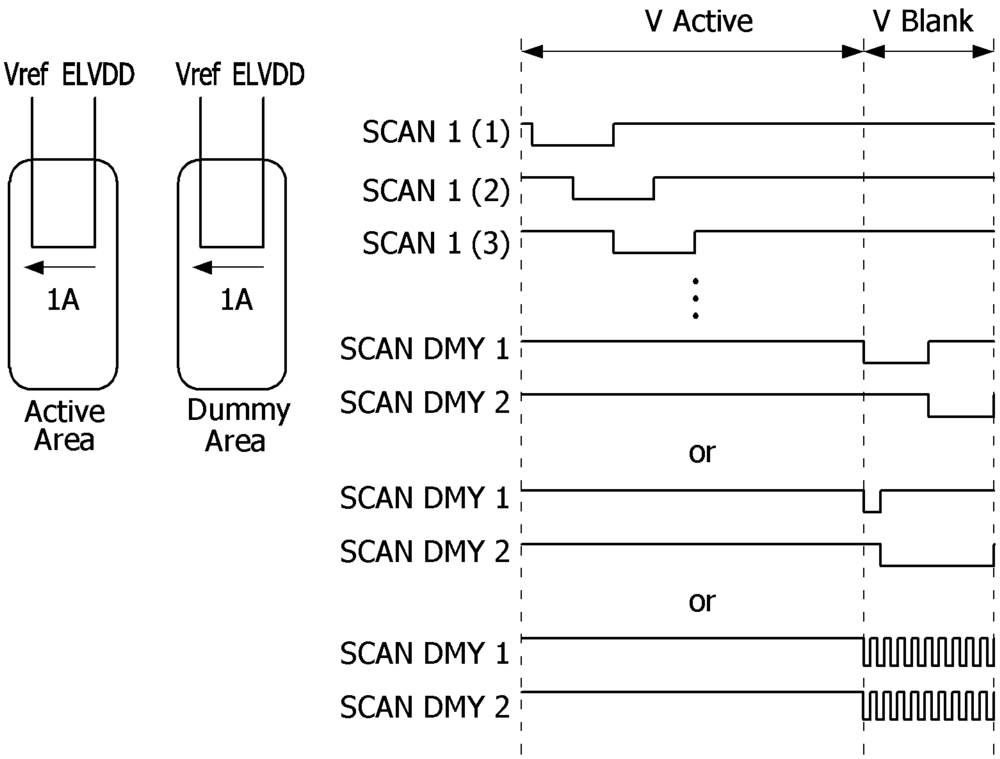

DISPLAY PANEL AND DISPLAY DEVICE INCLUDING THE SAME

CROSS-REFERENCE TO RELATED APPLICATION

This application claims priority under 35 U.S.C. § 119(a) to Korean Patent Application No. 10-2022-0158835 filed in the Republic of Korea on Nov. 24, 2022, the entirety of which is incorporated herein by reference into the present application.

BACKGROUND

1. Field of the Invention

The present disclosure relates to a display panel and a display device including the same.

2. Discussion of Related Art

Display devices can include a liquid crystal display (LCD) device, an electroluminescence display device, a field emission display (FED) device, a plasma display panel (PDP), and the like.

Some types of display devices, for example, a liquid crystal display device or an organic light emitting display device can include a display panel including a plurality of sub-pixels, a driver outputting a driving signal for driving the display panel, a power supply generating power to be supplied to the display panel or the driver, and the like. The drivers can include a gate driver that supplies a scan signal or a gate signal to the display panel, and a data driver that supplies a data signal to the display panel.

In such a display device, when a driving signal such as a scan signal, a light emission control (EM) signal, and a data signal is supplied to a plurality of sub-pixels formed in the display panel, the selected sub-pixel transmits light or emits light directly to thereby display an image.

However, in a display device including predetermined sub-pixels, since a short circuit can occur between a line to which a reference voltage is applied and a line to which a pixel driving voltage is applied in a vertical active period, but the short circuit does not occur in a vertical blank period, a reference voltage deviation can occur.

Further, if the reference voltage deviation occurs during duty driving of a light emission control (EM) signal, a limitation of distorting luminance of a specific area of the panel can occur, which may be noticeable to a viewer and impair image quality. Thus, there is a need for stably maintaining a reference voltage from a reference voltage line during vertical active periods and especially during vertical blank periods, in order to maintain uniform luminance of all the pixel lines in the display panel.

SUMMARY OF THE DISCLOSURE

The present disclosure is directed to solving or addressing all the above-described needs and limitations.

The present disclosure is directed to providing a display panel which prevents a reference voltage deviation and a display device including the same.

It should be noted that objects of the present disclosure are not limited to the above-described objects, and other objects of the present disclosure will be apparent to those skilled in the art from the following descriptions.

According to one aspect, a display panel of the present disclosure includes: a plurality of first pixel circuits to which a pixel driving voltage and a reference voltage are supplied, and a plurality of second pixel circuits in which a line to which the pixel driving voltage is supplied and a line to which the reference voltage is supplied are short-circuited for at least some time within a vertical blank period.

According to another aspect, a display device of the present disclosure includes: a display panel including a plurality of data lines, a plurality of gate lines crossing the data lines, a plurality of power lines to which different constant voltages are applied, a plurality of first pixel circuits to which a pixel driving voltage and a reference voltage are supplied through the power lines, and a plurality of second pixel circuits in which a line to which the pixel driving voltage is supplied and a line to which the reference voltage is supplied are short-circuited for at least some time within a vertical blank period; a data driver configured to supply a data voltage to the data lines; and a gate driver configured to supply a gate signal to the gate lines.

According to the present disclosure, a voltage fluctuation of a reference voltage can be prevented by adding dummy pixel lines to cause a short circuit between a line to which a reference voltage is applied and a line to which a pixel driving voltage is applied even in a vertical blank period.

According to the present disclosure, since a short circuit occurs in the same manner in the vertical active period and even in a vertical blank period, luminance of an entire panel can be maintained the same by preventing the voltage fluctuation of the reference voltage.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 1 is a block diagram of a display device according to an embodiment of the present disclosure;

FIG. 2 is a view illustrating an arrangement structure of a pixel array shown in FIG. 1 according to an embodiment of the present disclosure;

FIG. 3 is a view illustrating a cross-sectional structure of a display panel shown in FIG. 1 according to an embodiment of the present disclosure;

FIG. 4 is a view illustrating a pixel circuit according to an embodiment of the present disclosure and a driving timing thereof;

FIGS. 5A to 5C are views illustrating an operation of the pixel circuit step by step according to an embodiment of the present disclosure;

FIG. 6 is a view for describing a fluctuation principle of a reference voltage in one frame period;

FIGS. 7A to 7F are views for describing luminance distortion according to a reference voltage fluctuation;

FIG. 8 is a view illustrating a schematic structure of a display panel according to an embodiment of the present disclosure;

FIG. 9 is a view illustrating a dummy pixel circuit shown in FIG. 8 and a driving timing thereof according to an embodiment of the present disclosure;

FIGS. 10A to 10D are views for describing an operation principle of the display panel shown in FIG. 8 according to an embodiment of the present disclosure;

FIG. 11 is a view illustrating a schematic structure of a display panel according to another embodiment of the present disclosure;

FIG. 12 is a view illustrating a dummy pixel circuit shown in FIG. 11 and a driving timing thereof according to an embodiment of the present disclosure;

FIG. 13 is a circuit diagram illustrating a signal transmission unit shown in FIG. 11 in detail according to an embodiment of the present disclosure;

FIG. 14 is a waveform diagram illustrating an input/output signal and voltages of control nodes of the signal transmission unit shown in FIG. 13 according to an embodiment of the present disclosure;

FIG. 15 is a view illustrating a schematic structure of a display panel according to another embodiment of the present disclosure;

FIG. 16 is a waveform diagram illustrating a signal applied to a pixel in the display panel shown in FIG. 15 according to an embodiment of the present disclosure;

FIG. 17 is a view illustrating a schematic structure of a display panel according to another embodiment of the present disclosure;

FIG. 18 is a waveform diagram illustrating a signal applied to a pixel in the display panel shown in FIG. 17 according to an embodiment of the present disclosure; and FIGS. 19A to 19C are views illustrating various forms of dummy signals according to an embodiment of the present disclosure.

DETAILED DESCRIPTION OF THE EMBODIMENTS

The advantages and features of the present disclosure and methods for accomplishing the same will be more clearly understood from embodiments described below with reference to the accompanying drawings. However, the present disclosure is not limited to the following embodiments but can be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies can be omitted to avoid unnecessarily obscuring the subject matter of the present disclosure.

The terms such as “comprising,” “including,” “having,” etc. used herein are generally intended to allow other components to be added unless the terms are used with the term “only.” Any references to singular can include plural unless expressly stated otherwise.

Components are interpreted to include an ordinary error range even if not expressly stated.

When the position relation between two components is described using the terms such as “on,” “above,” “below,” and “next,” one or more components can be positioned between the two components unless the terms are used with the term “immediately” or “directly.”

The terms “first,” “second,” and the like can be used to distinguish components from each other, but the functions or structures of the components are not limited by ordinal numbers or component names in front of the components.

The same reference numerals can refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings. All the components of each display device according to all embodiments of the present disclosure are operatively coupled and configured.

FIG. 1 is a block diagram of a display device according to an embodiment of the present disclosure, FIG. 2 is a view illustrating an arrangement structure of a pixel array shown in FIG. 1 according to an embodiment of the present disclosure, and FIG. 3 is a view illustrating a cross-sectional structure of a display panel shown in FIG. 1 according to an embodiment of the present disclosure.

Referring to FIGS. 1 to 3, the display device according to an embodiment of the present disclosure includes a display panel 100, a display panel driving circuit for writing pixel data to pixels of the display panel 100, and a power supply 140 for generating power necessary for driving the pixels and the display panel driving circuit.

The display panel 100 includes a pixel array AA that displays an input image. The pixel array AA includes a plurality of data lines 102, a plurality of gate lines 103 intersected with the data lines 102, and pixels arranged in a matrix form.

The pixel array AA includes a plurality of pixel lines L1 to Ln. Each of the pixel lines L1 to Ln includes one line of pixels arranged along a line direction X in the pixel array AA of the display panel 100. Pixels arranged in one pixel line share the gate lines 103. Sub-pixels arranged in a column direction Y along a data line direction share the same data line 102. One horizontal period 1H is a time obtained by dividing one frame period by the total number of pixel lines L1 to Ln.

A dummy pixel line includes pixels of one line disposed in an X direction at an upper end portion or a lower end portion of a pixel array AA. The number of pixels disposed on one dummy pixel line is the same as the number of pixels disposed on one pixel line.

Here, a pixel array including one dummy pixel line is described as an example, but is not necessarily limited thereto, and can include a plurality of dummy pixel lines.

Touch sensors can be disposed on or within the display panel 100. A touch input can be sensed using separate touch sensors or can be sensed through pixels. The touch sensors can be disposed as an on-cell type or an add-on type on the screen of the display panel or implemented as in-cell type touch sensors embedded in the pixel array AA.

The display panel 100 can be implemented as a flexible display panel. The flexible display panel can be made of a plastic OLED panel. An organic thin film can be disposed on a back plate of the plastic OLED panel, and the pixel array AA can be formed on the organic thin film.

The back plate of the plastic OLED can be a polyethylene terephthalate (PET) substrate. The organic thin film is formed on the back plate. The pixel array AA and a touch sensor array can be formed on the organic thin film. The back plate blocks moisture permeation so that the pixel array AA is not exposed to humidity. The organic thin film can be a thin Polyimide (PI) film substrate. A multi-layered buffer film can be formed of an insulating material on the organic thin film. Lines can be formed on the organic thin film to supply power or signals applied to the pixel array AA and the touch sensor array.

To implement color, each of the pixels can be divided into a red sub-pixel (hereinafter referred to as "R sub-pixel"), a green sub-pixel (hereinafter referred to as "G sub-pixel"), and a blue sub-pixel (hereinafter referred to as "B sub-pixel"). Each of the pixels can further include a white sub-pixel. Each of the sub-pixels 101 includes a pixel circuit. The pixel circuit is connected to the data line 102 and the gate line 103.

Hereinafter, a pixel can be interpreted as having the same meaning as a sub-pixel.

As shown in FIG. 3, when viewed from a cross-sectional structure, the display panel 100 can include a circuit layer 12, a light emitting element layer 14, and an encapsulation layer 16 stacked on a substrate 10.

The circuit layer 12 can include a pixel circuit connected to wirings such as a data line, a gate line, and a power line, a gate driver (GIP) connected to the gate lines, a de-multiplexer array 112, a circuit for auto probe inspection, and the like. The wirings and circuit elements of the circuit layer 12 can include a plurality of insulating layers, two or more metal layers separated with the insulating layer therebetween, and an active layer including a semiconductor material. All transistors formed in the circuit layer 12 can be implemented as oxide TFTs having an n-channel type oxide semiconductor.

The light emitting element layer 14 can include a light emitting element EL driven by a pixel circuit. The light emitting element EL can include a red (R) light emitting element, a green (G) light emitting element, and a blue (B) light emitting element. The light emitting element layer 14 can include a white light emitting element and a color filter. The light emitting elements EL of the light emitting element layer 14 can be covered by a protective layer including an organic film and a passivation film.

The encapsulation layer 16 covers the light emitting element layer 14 to seal the circuit layer 12 and the light emitting element layer 14. The encapsulation layer 16 can have a multilayered insulating structure in which an organic film and an inorganic film are alternately stacked. The inorganic film blocks the penetration of moisture and oxygen. The organic film planarizes the surface of the inorganic film. When the organic film and the inorganic film are stacked in multiple layers, a movement path of moisture or oxygen becomes longer compared to a single layer, so that penetration of moisture and oxygen affecting the light emitting element layer 14 can be effectively blocked.

A touch sensor layer can be disposed on the encapsulation layer 16. The touch sensor layer can include capacitive type touch sensors that sense a touch input based on a change in capacitance before and after the touch input. The touch sensor layer can include metal wiring patterns and insulating layers forming the capacitance of the touch sensors. The capacitance of the touch sensor can be formed between the metal wiring patterns. A polarizing plate can be disposed on the touch sensor layer. The polarizing plate can improve visibility and contrast ratio by converting the polarization of external light reflected by metal of the touch sensor layer and the circuit layer 12. The polarizing plate can be implemented as a polarizing plate in which a linear polarizing plate and a phase delay film are bonded, or a circular polarizing plate. A cover glass can be adhered to the polarizing plate.

The display panel 100 can further include a touch sensor layer and a color filter layer stacked on the encapsulation layer 16. The color filter layer can include red, green, and blue color filters and a black matrix pattern. The color filter layer can replace the polarizing plate and increase the color purity by absorbing a part of the wavelength of light reflected from the circuit layer and the touch sensor layer. In this embodiment, by applying the color filter layer having a higher light transmittance than the polarizing plate to the display panel, the light transmittance of the display panel can be improved, and the thickness and flexibility of the display panel can be improved. A cover glass can be adhered on the color filter layer.

The power supply 140 generates DC power required for driving the pixel array AA and the display panel driving circuit of the display panel 100 by using a DC-DC converter. The DC-DC converter can include a charge pump, a regulator, a buck converter, a boost converter, and the like. The power supply 140 can adjust a DC input voltage from a host system and thereby generate DC voltages such as a gamma reference voltage VGMA, gate-on voltages VGH and VEH, gate-off voltages VGL and VEL, a pixel driving voltage ELVDD, and a pixel low-potential power supply voltage ELVSS, a reference voltage Vref, an initialization voltage Vinit, and an anode voltage Vano. The gamma reference voltage VGMA is supplied to a data driver 110. The gate-on voltages VGH and VEH and the gate-off voltages VGL and VEL are supplied to a gate driver 120. The pixel driving voltage ELVDD and the pixel low-potential power supply voltage ELVSS are commonly supplied to the pixels.

The display panel driving circuit writes pixel data (digital data) of an input image to the pixels of the display panel 100 under the control of a timing controller (TCON) 130.

The display panel driving circuit includes the data driver 110 and the gate driver 120.

A de-multiplexer (DEMUX) 112 can be disposed between the data driver 110 and the data lines 102. The de-multiplexer 112 sequentially connects one channel of the data driver 110 to the plurality of data lines 102 and distributes in a time division manner the data voltage outputted from one channel of the data driver 110 to the data lines 102, thereby reducing the number of channels of the data driver 110. The de-multiplexer array 112 can be omitted. In this situation, output buffers AMP of the data driver 110 are directly connected to the data lines 102.

The display panel driving circuit can further include a touch sensor driver for driving the touch sensors. The touch sensor driver is omitted from FIG. 1. In a mobile device, the timing controller 130, the power supply 140, the data driver 110, and the like can be integrated into one drive integrated circuit (IC).

The data driver 110 generates a data voltage Vdata by converting pixel data of an input image received from the timing controller 130 with a gamma compensation voltage every frame period by using a digital to analog converter (DAC). The gamma reference voltage VGMA is divided for respective gray scales through a voltage divider circuit. The gamma compensation voltage divided from the gamma reference voltage VGMA is provided to the DAC of the data driver 110. The data voltage Vdata is outputted through the output buffer AMP in each of the channels of the data driver 110.

In the data driver 110, the output buffer AMP included in one channel can be connected to adjacent data lines 102 through the de-multiplexer array 112. The de-multiplexer array 112 can be formed directly on the substrate of the display panel 100 or integrated into one drive IC together with the data driver 110.

The data driver 110 can include sensing units 111. The sensing units 111 can include a first sensing unit 111*a* and a second sensing unit 111*b*. The first sensing unit 111*a* can measure currents flowing in pixels disposed in an active area and provide measured values to the timing controller 130. The second sensing unit 111*b* can measure currents flowing in pixels disposed in a dummy area and provide measured values to the timing controller 130.

The gate driver 120 can be implemented as a gate in panel (GIP) circuit formed directly on a bezel BZ area of the display panel 100 together with the TFT array of the pixel array AA. The gate driver 120 sequentially outputs gate signals to the gate lines 103 under the control of the timing controller 130. The gate driver 120 can sequentially supply the gate signals to the gate lines 103 by shifting the gate signals using a shift register.

The gate signal can include a scan signal for selecting pixels of a line in which data is to be written in synchronization with the data voltage, and an EM signal defining an emission time of pixels charged with the data voltage.

The gate driver 120 can include a scan driver 121, an EM driver 122, and an initialization driver 123.

The scan driver 121 outputs a scan signal SCAN in response to a start pulse and a shift clock from the timing controller 130, and shifts the scan signal SCAN according to the shift clock timing. The EM driver 122 outputs an EM signal EM in response to a start pulse and a shift clock from the timing controller 130, and sequentially shifts the EM signal EM according to the shift clock. The initialization driver 123 outputs an initialization signal INIT in response to a start pulse and a shift clock from the timing controller 130, and shifts the initialization signal INIT according to the shift clock timing. Therefore, the scan signal SCAN, the EM signal EM, and the initialization signal INIT are sequentially supplied to the gate lines 103 of the pixel lines L1 to Ln. In a bezel-free model, at least some of transistors constituting the gate driver 120 and clock wirings can be dispersedly disposed in the pixel array AA.

The timing controller 130 receives, from a host system, digital video data DATA of an input image and a timing signal synchronized therewith. The timing signal includes a vertical synchronization signal Vsync, a horizontal synchronization signal Hsync, a main clock CLK, a data enable signal DE, and the like. Because a vertical period and a horizontal period can be known by counting the data enable signal DE, the vertical synchronization signal Vsync and the horizontal synchronization signal Hsync can be omitted. The data enable signal DE has a cycle of one horizontal period (1H).

The host system can be any one of a television (TV) system, a set-top box, a navigation system, a personal computer (PC), a home theater system, a vehicle system, and a mobile device system, but embodiments are not limited thereto.

The timing controller 130 multiplies an input frame frequency by i and controls the operation timing of the display panel driving circuit with a frame frequency of the input frame frequency×i (where i is a positive integer greater than 0) Hz. The input frame frequency is 60 Hz in the NTSC (National Television Standards Committee) scheme and 50 Hz in the PAL (Phase-Alternating Line) scheme.

Based on the timing signals Vsync, Hsync, and DE received from the host system, the timing controller 130 generates a data timing control signal for controlling the operation timing of the data driver 110, MUX signals for controlling the operation timing of the de-multiplexer array 112, and a gate timing control signal for controlling the operation timing of the gate driver 120.

The voltage level of the gate timing control signal outputted from the timing controller 130 can be converted into the gate-on voltages VGH and VEH and the gate-off voltages VGL and VEL through a level shifter and then supplied to the gate driver 120. That is, the level shifter converts a low level voltage of the gate timing control signal into the gate-off voltages VGL and VEL and converts a high level voltage of the gate timing control signal into the gate-on voltages VGH and VEH. The gate timing signal includes the start pulse and the shift clock.

The timing controller 130 can output a dummy signal based on the value measured by the sensing units 111 or can output control signals of the gate drivers 120 which output the dummy signal.

FIG. 4 is a view illustrating a pixel circuit according to the embodiment of the present disclosure and a driving timing thereof, and FIGS. 5A to 5C are views illustrating an operation of the pixel circuit step by step.

Referring to FIG. 4, a pixel circuit according to an embodiment of the present disclosure includes a light-emitting element EL, a driving element DT which supplies a current to the light-emitting element EL, a plurality of switch elements M01, M02, M03, M04, and M05 which switch current paths connected to the driving element DT, and a capacitor Cst which stores a gate-source voltage of the driving element DT. The driving element DT and the switch elements M01, M02, M03, M04, and M05 can be implemented as P-channel oxide thin film transistors (TFTs), but are not necessarily limited thereto, and can be implemented as N-channel oxide TFTs.

The light emitting element EL emits light by a current applied through a channel of the driving element DT according to a gate-source voltage Vgs of the driving element DT that varies according to a data voltage VDATA.

The driving element DT drives the light emitting element EL by supplying a current to the light emitting element EL according to the gate-source voltage Vgs. The driving element DT includes a gate electrode connected to a first node n1, a first electrode (or drain electrode) connected to a first power line 41, and a second electrode (or source electrode) connected to a second node n2.

A first switch element M01 is turned on according to a gate-on voltage of a light emission control (EM) signal EM N to connect a second electrode of the driving element DT to an anode of the light-emitting element EL. The first switch element M01 includes a gate electrode connected to a gate line to which the EM signal is applied, a first electrode connected to a second node n2, and a second electrode connected to a third node n3. The first switch element M01 blocks a current path to the light-emitting element so that the light-emitting element does not emit light according to a gate-off voltage of the EM signal.

A second switch element M02 is turned on according to a gate-on voltage of a first scan signal SCAN1 to connect a first node, that is, a gate electrode of the driving element DT and the second node so that the driving element DT operates as a diode. The second switch element M02 includes a gate electrode connected to a gate line to which the first scan signal is applied, a first electrode connected to the first node, and a second electrode connected to the second node.

A third switch element M03 is turned on according to a gate-on voltage of a second scan signal SCAN2 to connect a data voltage line 40 to a fourth node n4 and apply a data voltage VDATA. The third switch element M03 includes a gate electrode connected to a gate line to which the second scan signal is applied, a first electrode connected to the data voltage line 40 to which the data voltage is applied, and a second electrode connected to the fourth node n4.

A fourth switch element M04 is turned on according to the gate-on voltage of the first scan signal SCAN1 to connect a reference voltage line 43 to the third node n3 and apply a reference voltage Vref. The fourth switch element M04 includes a gate electrode connected to the gate line to which the first scan signal is applied, a first electrode connected to a fifth node n5, and a second electrode connected to the third node n3.

A fifth switch element M05 is turned on according to the gate-on voltage of the EM signal EM N to connect the fourth node n4 or a reference voltage line 43 to the fifth node n5 and apply a reference voltage Vref. The fifth switch element M05 includes a gate electrode connected to the gate line to which the EM signal is applied, a first electrode connected to the fifth node n5, and a second electrode connected to the fourth node n4.

The capacitor Cst is connected between the first node n1 and the fourth node n4. A data voltage compensated by a threshold voltage (Vth) of the driving element DT is charged in the capacitor Cst. Since the data voltage is compensated by the threshold voltage of the driving element DT, a characteristic deviation of the driving element between the pixels is compensated.

The pixel circuit of the embodiment can be operated in periods divided into a first period T1, a second period T2, and a third period T3.

As shown in FIG. 5A, the pixel circuit is initialized in the first period T1. In the first period T1, the first switch element M01, the second switch element M02, the fourth switch element M04, and the fifth switch element M05 are turned on, and the third switch element M03 is turned off.

In this situation, a short circuit can occur between the reference voltage line 43 and a first power line 41. As the short circuit occurs in the first period T1, the reference voltage and a pixel driving voltage can be distorted, which can impair image quality.

As shown in FIG. 5B, the pixel circuit samples the threshold voltage of the driving element and compensates for a data voltage of pixel data by the threshold voltage in the second period T2. In the second period T2, the second switch element M02, the third switch element M03, and the fourth switch element M04 are turned on, and the first switch element M01 and the fifth switch element M05 are turned off.

As shown in FIG. 5C, the pixel circuit emits light in the third period T3. In the third period T3, the first switch element M01 and the fifth switch element M05 are turned on, and the second switch element M02, the third switch element M03, and the fourth switch element M04 are turned off.

As described above, since the pixel circuit according to the embodiment senses the threshold voltage using the pixel driving voltage, when light is emitted, a pixel driving voltage VDD is removed in relation to Vgs, and thus there is no influence by IR drop. Vgs in this situation can be defined as in Equation 1 below.

$$Vgs = Vref - V\mathrm{DATA} + Vth \qquad \text{[Equation 1]}$$

On the other hand, as a short circuit occurs between the reference voltage line 43 to which the reference voltage is applied and a first power line 41 to which the pixel driving voltage is applied in the first period T1, the reference voltage Vref and the pixel driving voltage can be distorted, which can impair image quality.

FIG. 6 is a view for describing a fluctuation principle of a reference voltage in one frame period.

Referring to FIG. 6, one frame includes a vertical active period V_Active and a vertical blank period V_Blank. In the vertical active period V_Active, a short circuit between the reference voltage line of one pixel line or more and the first power line always occurs, but in the vertical blank period V_Blank, since there is no pixel line which performs an initialization operation, so the short circuit between the reference voltage line and the first power line does not occur.

Accordingly, the reference voltage rises due to the short circuit in the vertical active period V_Active, but since the short circuit does not occur in the vertical blank period V_Blank, the reference voltage is lowered to an original voltage. For example, during each vertical blank period V_Blank, the reference voltage line experiences a drop in voltage, as shown in FIG. 6.

The distortion of the reference voltage affects the entire panel, and thus does not cause a large issue in a general situation, but it can distort luminance of a specific area of the panel during duty driving of the EM signal.

FIGS. 7A to 7F are views for describing luminance distortion according to a reference voltage fluctuation.

Referring to FIGS. 7A and 7F, when the pixels in the display panel are divided into four blocks and the EM signal is driven with a duty ratio of 50% (e.g., the EM signal is on or high for half of the period, and off or low for the other half), a relationship between the duty driving of the EM signal and the distortion of the reference voltage is illustrated, but embodiments are not limited thereto, and other duty ratios can be used.

As shown in FIG. 7A, the duty ratio driving can be realized by sequentially supplying the EM signal to EM lines. The pixels can be repeatedly turned on and off according to the EM signal to perform the duty ratio driving.

As shown in FIGS. 7B and 7C, according to the EM signal, pixels in a first block and a third block are turned on, and pixels in a second block and a fourth block are turned off in a first quarter frame period which is the vertical active period V_Active. In this situation, as the short circuit between the reference voltage line and the first power line occurs in an initialization period which is the first period (e.g., Vref and ELVDD become electrically connected with each other, see the short horizontal line in the first period of FIG. 7C, etc.), the reference voltages of the pixels in the first block and the third block rise, and accordingly, the luminance decreases. For example, when the reference voltage on the reference voltage line slightly rises, then the luminance of the pixels slightly decreases.

As shown in FIGS. 7B and 7D, according to the EM signal, the pixels in the second block and the fourth block are turned on, and the pixels in the first block and the third block are turned off in a second quarter frame period. In this situation, as the short circuit between the reference voltage line and the first power line occurs in the initialization period which is the first period, the reference voltages of the pixels in the second block and the fourth block rise, and accordingly, the luminance decreases.

As shown in FIGS. 7B and 7E, according to the EM signal, the pixels in the first block and the third block are turned on, and the pixels in the second block and the fourth block are turned off in a third quarter frame period. In this situation, as the short circuit between the reference voltage line and the first power line occurs in the initialization period which is the first period, the reference voltages of the pixels in the first block and the third block rise, and accordingly, the luminance decreases.

As shown in FIGS. 7B and 7F, since there is no initialization period which is the first period in a fourth quarter frame period which is the vertical blank period V_Blank, there is no occurrence of the short circuit between the reference voltage line and the first power line in the initialization period, and thus the reference voltage is maintained at an original voltage (e.g., no rise in VREF), and accordingly, the luminance rises.

When the luminance of one frame is synthesized based on this, a lateral band-shaped image defect occurs in which areas which emit light in the vertical blank period appear brighter than other areas, which can detract from the user's viewing experience.

For example, the sum of the luminance of the first block and the luminance of the third block is 126+0+126+0=252 and thus an average thereof becomes 252/4=63, and the sum of the luminance of the second block and the luminance of the fourth block is 0+126+0+130=256 and thus an average thereof becomes 256/4-64. Accordingly, the average of the second block and the fourth block is greater than the average of the first block and the third block, and thus the second block and the fourth block appear brighter.

Accordingly, in an embodiment, in order to improve this defect or prevent such a defect from occurring, a dummy pixel line is added to cause the short circuit between the reference voltage line and the first power line even in a vertical blank area. For example, even though the dummy pixel line does not display an image, it can be controlled similar to an active pixel line to carry out an initialization procedure which can cause a remaining active pixel line to equally experience the same type of luminance decrease as the other active pixel lines, in order to maintain a uniform image across the entire screen.

FIG. 8 is a view illustrating a schematic structure of a display panel according to a first embodiment of the present disclosure, FIG. 9 is a view illustrating a dummy pixel circuit shown in FIG. 8 and a driving timing thereof, and FIGS. 10A to 10D are views for describing an operation principle of the display panel shown in FIG. 8.

Referring to FIG. 8, a display panel according to a first embodiment of the present disclosure can include a plurality of first pixel circuits 101-1 (e.g., normal pixel circuits for displaying an image), a plurality of second pixel circuits 101-2 (e.g., dummy pixel circuits that are not used for displaying an image), and a gate driver 120 including a shift register composed of a plurality of signal transmission units ST(1), . . . , and ST(N), wherein the signal transmission unit ST(1) is configured to receive a start pulse VST.

The plurality of first pixel circuits 101-1 can be disposed in an active pixel area where an input image is displayed. The first pixel circuit 101-1 can be implemented as the pixel circuit shown in FIG. 3.

The plurality of second pixel circuits 101-2 can be disposed in a dummy pixel area adjacent to the active pixel area. The dummy pixel area can be formed at an upper end portion or a lower end portion of the active pixel area. The second pixel circuit 101-2 can be implemented as a pixel circuit different from the first pixel circuit 101-1, but is not limited thereto, and can be implemented as the same pixel circuit as the first pixel circuit 101-1, and in addition, can be implemented as a circuit capable of causing a short circuit between a reference voltage line and a first power line.

The plurality of second pixel circuits 101-2 can be connected to one dummy gate line to form one dummy pixel line. In this situation, the plurality of second pixel circuits 101-2 forming the one dummy pixel line can be implemented as a pixel circuit having a horizontal resolution.

In this situation, the plurality of second pixel circuits 101-2 are scanned before a first pixel line of the active pixel area when they are formed at the upper end portion of the active pixel area, and the plurality of second pixel circuits 101-2 are scanned after the last pixel line of the active pixel area when they are formed at the lower end portion of the active pixel area.

The signal transmission units ST(1), . . . , and ST(N) can apply gate signals to the plurality of first pixel circuits 101-1 connected to gate lines. The signal transmission units ST(1), . . . , and ST(N) can be disposed at a left side portion or right side portion of a pixel array.

Referring to FIG. 9, the second pixel circuit 101-2 according to the embodiment can be implemented as a pixel circuit different from the first pixel circuit 101-1 to reduce a size of a bezel area by reducing the dummy pixel area (e.g., some of the circuits that are present in the active type of pixel circuit can be omitted from the dummy type of pixel circuit, in order to save space and conserve resources).

The second pixel circuit 101-2 can include a driving element DT and a switch element M01. The second pixel circuit 101-2 does not emit light because it is a dummy pixel circuit, and thus does not require a light-emitting element, and can be implemented in a structure capable of short-circuiting the reference voltage line to which a reference voltage is applied and the first power line to which a pixel driving voltage is applied by a dummy signal SCAN DMY in a vertical blank period. For example, according to an embodiment, the second pixel circuit 101-2 (e.g., dummy pixel circuit) can be implemented as just a switch that connects the reference voltage line to the first power line to cause a short circuit, in response to a dummy signal SCAN DMY, but embodiments are not limited thereto. For example, according to an embodiment, at least two transistors connected in series can be used for the dummy pixel circuit, in which one transistor has a gate configured to receive the dummy signal SCAN DMY and the other transistor has its gate tied to its source or drain electrode, but embodiments are not limited thereto.

The driving element DT can control current flowing when the short circuit between the reference voltage line and the first power line occurs. The driving element DT can serve as a resistor for controlling the current, but since it is difficult to predict a resistance value for controlling the current, the driving element DT is difficult to be replaced as a resistor element. However, when the resistance value can be predicted, the driving element DT can be replaced with a resistor or the resistance element.

The switch element M01 can be turned on according to a gate-on voltage of the dummy signal SCAN DMY applied in the vertical blank period V_Blank to short-circuit the reference voltage line and the first power line.

Referring to FIG. 10A, the short circuit occurs between the reference voltage line and the first power line in the first pixel line in a first quarter frame period of a vertical active period V_Active (e.g., the short circuit is represented in the figure as a short horizontal line in the first row of pixels connecting Vref to ELVDD).

Referring to FIG. 10B, the short circuit occurs between the reference voltage line and the first power line in a second pixel line in a second quarter frame period of the vertical active period V_Active (e.g., the short circuit is represented in the figure as a short horizontal line in the second row of pixels connecting Vref to ELVDD).

Referring to FIG. 10C, the short circuit occurs between the reference voltage line and the first power line in a third pixel line in a third quarter frame period of the vertical active period V_Active (e.g., the short circuit is represented in the figure as a short horizontal line in the third row of pixels connecting Vref to ELVDD).

Referring to FIG. 10D, the short circuit occurs between the reference voltage line and the first power line in a dummy pixel line instead of a fourth pixel line in a fourth quarter frame period of the vertical blank period V_Blank (e.g., the short circuit is represented in the figure as a short horizontal line in the last row of pixels connecting Vref to ELVDD, which is the row of dummy pixels 101-2).

As described above, in an embodiment, since distortion of the reference voltage occurs equally in both of the vertical active period and the vertical blank period, a voltage fluctuation does not occur, luminance of the panel is not lowered and an image having uniform brightness can be presented across the entire display area.

FIG. 11 is a view illustrating a schematic structure of a display panel according to a second embodiment of the present disclosure, FIG. 12 is a view illustrating a dummy pixel circuit shown in FIG. 11 and a driving timing thereof, FIG. 13 is a circuit diagram illustrating a signal transmission unit shown in FIG. 11 in detail, and FIG. 14 is a waveform diagram illustrating an input/output signal and voltages of control nodes of the signal transmission unit shown in FIG. 13.

Referring to FIG. 11, a display panel according to a second embodiment of the present disclosure can include a plurality of first pixel circuits 101-1, a plurality of second pixel circuits 101-2, and a gate driver 120 including a shift register composed of a plurality of signal transmission units ST(1), . . . , and ST(N) and one dummy signal transmission unit DST, wherein the signal transmission unit ST(1) is configured to receive a first start pulse VST1, and the dummy signal transmission unit DST is configured to receive a second start pulse VST2.

The plurality of first pixel circuits 101-1 can be disposed in an active pixel area where an input image is displayed. The first pixel circuit 101-1 can be implemented as the pixel circuit shown in FIG. 3.

The plurality of second pixel circuits 101-2 (e.g., dummy pixel circuits) can be disposed in a dummy pixel area adjacent to the active pixel area. The dummy pixel area can be formed at an upper end portion or a lower end portion of the active pixel area. The second pixel circuit 101-2 can be implemented as a type of pixel circuit that is different than the first pixel circuit 101-1, but is not limited thereto, and can be implemented as the same type of pixel circuit as the first pixel circuit 101-1, and in addition, can be implemented as a circuit capable of causing a short circuit between a reference voltage line and a first power line (e.g., a circuit configured to electrically connect a reference voltage line and a first power line with each other).

The plurality of second pixel circuits 101-2 can be connected to one dummy gate line to form one dummy pixel line. In this situation, the plurality of second pixel circuits 101-2 forming the one dummy pixel line can be implemented as a pixel circuit having a horizontal resolution.

The signal transmission units ST(1), . . . , and ST(N) can apply gate signals to the plurality of first pixel circuits 101-1 connected to gate lines. The signal transmission units ST(1), . . . , and ST(N) can be disposed at a left side portion or right side portion of a pixel array.

The dummy signal transmission unit DST is driven independently of the signal transmission units ST and can apply a dummy signal SCAN DMY to the plurality of second pixel circuits 101-2 connected to the dummy gate line.

Referring to FIG. 12, the second pixel circuit 101-2 (e.g., dummy pixel circuit that is not used for image display) according to the embodiment is implemented as the same type of pixel circuit as the first pixel circuit 101-1 (e.g., normal pixel circuit for displaying an image), and the signal transmission units in the dummy area can be implemented in the same way as the signal transmission units in the active area. The second pixel circuit 101-2 is implemented as the same type of pixel circuit as the first pixel circuit 101-1 to maintain the same amount of current generated during a short circuit as in the situation of the first pixel circuit 101-1, which can more accurately provide uniform luminance.

The second pixel circuit 101-2 includes a light-emitting element EL, a driving element DT which supplies current to the light-emitting element EL, a plurality of switch elements M01, M02, M03, M04, and M05 which switch current paths connected to the driving element DT, and a capacitor Cst which stores a gate-source voltage of the driving element DT. The driving element DT and the switch elements M01, M02, M03, M04, and M05 can be implemented as P-channel oxide thin film transistors (TFTs), but are not necessarily limited thereto, and can be implemented as N-channel oxide TFTs.

The light emitting element EL emits light by a current applied through a channel of the driving element DT according to a gate-source voltage Vgs of the driving element DT that varies according to a data voltage VDATA.

The driving element DT drives the light emitting element EL by supplying a current to the light emitting element EL according to the gate-source voltage Vgs. The driving element DT includes a gate electrode connected to a first node n1, a first electrode (or drain electrode) connected to a first power line 41, and a second electrode (or source electrode) connected to a second node n2.

A first switch element M01 is turned on according to a gate-on voltage of the dummy signal SCAN DMY to connect a second electrode of the driving element DT to an anode of the light-emitting element EL. The first switch element M01 includes a gate electrode connected to a gate line to which the dummy signal SCAN DMY is applied, a first electrode connected to a second node n2, and a second electrode connected to a third node n3. The first switch element M01 blocks a current path to the light-emitting element so that the light-emitting element does not emit light according to a gate-off voltage of the dummy signal.

A second switch element M02 is turned on according to the gate-on voltage of the dummy signal SCAN DMY to connect a first node, that is, a gate electrode of the driving element DT and the second node so that the driving element DT operates as a diode. The second switch element M02 includes a gate electrode connected to a gate line to which the dummy signal SCAN DMY is applied, a first electrode connected to the first node, and a second electrode connected to the second node.

A third switch element M03 is turned on according to a gate-on voltage of a second scan signal SCAN2 to connect a data voltage line 40 to a fourth node n4 and apply a data voltage VDATA. The third switch element M03 includes a gate electrode connected to a gate line to which the second scan signal is applied, a first electrode connected to the data voltage line 40 to which the data voltage is applied, and a second electrode connected to the fourth node n4.

A fourth switch element M04 is turned on according to the gate-on voltage of the dummy signal SCAN DMY to connect a reference voltage line 43 to the third node n3 and apply a reference voltage Vref. The fourth switch element M04 includes a gate electrode connected to the gate line to which the dummy signal SCAN DMY is applied, a first electrode connected to a fifth node n5, and a second electrode connected to the third node n3.

A fifth switch element M05 is turned on according to the gate-on voltage of the dummy signal SCAN DMY to connect the fourth node n4 or a reference voltage line 43 to the fifth node n5 and apply a reference voltage Vref. The fifth switch element M05 includes a gate electrode connected to the gate line to which the dummy signal SCAN DMY is applied, a first electrode connected to the fifth node n5, and a second electrode connected to the fourth node n4.

The capacitor Cst is connected between the first node n1 and the fourth node n4.

In an embodiment, the first switch element M01, the second switch element M02, the fourth switch element M04, and the fifth switch element M05 can maintain a turned-off state in a vertical active period according to a gate-high voltage of the dummy signal SCAN DMY, and can be turned on in a vertical blank period according to a gate-low voltage of the dummy signal SCAN DMY in order to short-circuit the reference voltage line and a first power line (e.g., in order to electrically connect the reference voltage line and the first power line with each other).

Referring to FIGS. 13 and 14, the dummy signal transmission unit according to the embodiment of the present disclosure can output a dummy signal, and can be implemented with the same type of circuit as the signal transmission unit which outputs the gate signal.

The dummy signal transmission unit can include a first circuit unit 71 and a second circuit unit 72.

The first circuit unit 71 can charge or discharge a first control node (hereinafter referred to as "a Q node") and a second control node (hereinafter referred to as "a QB node"). The first circuit unit 71 can include a 1 A transistor T1A, a 1B transistor T1B, a second transistor T2, a third transistor T3, a fourth transistor T4, a fifth transistor T5, and an eighth transistor T8. For example, the first circuit unit 71 can be referred to as a charge/discharge circuit configured to charge and discharge the Q node and the QB node.

The 1 A transistor T1A is turned on by a second clock signal CLK2 and applies a low voltage of a second start pulse VST2 to the first node n1 together with the 1B transistor T1B. The 1 A transistor T1A includes a gate electrode to which the second clock signal is applied, a first electrode to which the second start pulse VST2 is applied, and a second electrode connected to a first electrode of the 1B transistor T1B.

The 1B transistor T1B is turned on by the second clock signal CLK2 and applies the low voltage of the second start pulse VST2 to the first node together with the 1 A transistor T1A. The 1B transistor T1B includes a gate electrode to which the second clock signal is applied, the first electrode connected to the second electrode of the 1A transistor T1A, and a second electrode connected to the first node.

The second transistor T2 is turned on by a first clock signal CLK1 and applies a gate-high voltage VGH to the first node together with the third transistor T3. The second transistor T2 includes a gate electrode to which the first clock signal is applied, a first electrode connected to the first node, and a second electrode connected to a first electrode of the third transistor T3.

The third transistor T3 is turned on by a low voltage of the QB node and applies the gate-high voltage VGH to the first node together with the second transistor T2. The third transistor T3 includes a gate electrode connected to the QB node, the first electrode connected to the second electrode of the second transistor T2, and a second electrode to which the gate-high voltage VGH is applied.

The fourth transistor T4 is turned on by the second clock signal CLK2 and applies a gate-low voltage VGL to the QB node. The fourth transistor T4 includes a gate electrode to which the second clock signal is applied, a first electrode to which the gate-low voltage is applied, and a second electrode connected to the QB node.

The fifth transistor T5 is turned on by a low voltage of the first node and applies the second clock signal to the QB node. The fifth transistor T5 includes a gate electrode connected to the first node, a first electrode to which the second clock signal is applied, and a second electrode connected to the QB node.

The eighth transistor T8 is turned on by the gate-low voltage and connects the first node to the Q node. The eighth transistor T8 includes a gate electrode to which gate-low voltage is applied, a first electrode connected to the first node, and a second electrode connected to the Q node. The eighth transistor T8 is disposed to separate the first node and the Q node to prevent a drastic change of the voltage of the first node while the Q node is bootstrapped by a first capacitor CQ.

The second circuit unit 72 can output the dummy signal to an output node based on potentials of the Q node and the QB node. The second circuit unit 72 can include a pull-up transistor T6 and a pull-down transistor T7. The second circuit unit 72 can be referred to as an output buffer circuit.

The pull-up transistor T6 and the pull-down transistor T7 charge and discharge the output node according to voltages of the Q node Q and the QB node QB to output a dummy signal SRO (SCAN DMY). The pull-up transistor T6 includes a gate electrode connected to the Q node Q, a first electrode to which the first clock signal CLK1 is applied, and a second electrode connected to the output node. The pull-down transistor T7 is connected to the pull-up transistor T6 with the output node therebetween. The pull-down transistor T7 includes a gate electrode connected to the QB node QB, a first electrode connected to the output node, and a second electrode to which the gate-high voltage VGH is applied.

A first electrode of the first capacitor CQ is connected to the Q node Q and a second electrode of the first capacitor CQ is connected to the output node. A first electrode of a second capacitor CQB is connected to the QB node QB, and a second electrode of the second capacitor CQB is connected to a node to which a gate-high voltage VGH is input.

As shown in FIG. 13, the dummy signal transmission unit can output the dummy signal in the vertical blank period. The dummy signal transmission unit can output the gate-low voltage of the dummy signal in the vertical blank period.

FIG. 15 is a view illustrating a schematic structure of a display panel according to a third embodiment of the present disclosure, and FIG. 16 is a waveform diagram illustrating a signal applied to a pixel in the display panel shown in FIG. 15.

Referring to FIG. 15, a display panel according to a third embodiment of the present disclosure can include a plurality of first pixel circuits 101-1, a plurality of second pixel circuits 101-2, and a gate driver 120 including a shift register composed of a plurality of signal transmission units ST(1), . . . , and ST(N), wherein the signal transmission unit ST(1) is configured to receive a start pulse VST.

The plurality of first pixel circuits 101-1 can be disposed in an active pixel area where an input image is displayed. The first pixel circuit 101-1 can be implemented as the pixel circuit shown in FIG. 3.

The plurality of second pixel circuits 101-2 can be disposed in a dummy pixel area adjacent to the active pixel area. The dummy pixel area can be formed at an upper end portion or a lower end portion of the active pixel area. The second pixel circuit 101-2 can be implemented as a pixel circuit that is different than the first pixel circuit 101-1 or can be implemented as the same type of pixel circuit as the first pixel circuit 101-1, and in addition, can be implemented as an arbitrary circuit capable of causing a short circuit between a reference voltage line and a first power line. For example, according to another embodiment, the second pixel circuits can be implemented as only one switch element that connects a reference voltage line and a first power line with each other, but embodiments are not limited thereto.

The plurality of second pixel circuits 101-2 can be connected to a plurality of dummy gate lines to form a plurality of dummy pixel lines. In this situation, the plurality of second pixel circuits 101-2 each forming the dummy pixel lines can be implemented as a pixel circuit having a horizontal resolution.

The plurality of second pixel circuits 101-2 can include pixel circuits 101-2 in a dummy area 1 and pixel circuits 101-2 in a dummy area 2. The pixel circuits 101-2 in the dummy area 1 and the pixel circuits 101-2 in the dummy area 2 can be disposed in parallel to form a first dummy pixel line and a second dummy pixel line.

Here, an example in which the second pixel circuits 101-2 are formed as two dummy pixel lines is described, but the present disclosure is not necessarily limited thereto, and the second pixel circuits 101-2 can be formed as three or more dummy pixel lines.

The two or more dummy pixel lines are formed in this way to prevent display quality defects due to deterioration by alternately driving the two or more dummy pixel lines to disperse deterioration of driving elements in the dummy pixel lines because a limitation in display quality can occur due to the deterioration of the driving elements when the vertical blank period is too long. In order words, two or more dummy pixel lines can be used in an alternating manner in order to alleviate the stress experienced on any one dummy pixel line, thus extending the lifespan of the device.

As shown in FIG. 16, a gate-low voltage of a first dummy signal can be applied to the pixel circuits 101-2 in the dummy area 1 forming the first dummy pixel line in a first half vertical blank period, and a gate-low voltage of a second dummy signal can be applied to the pixel circuits 101-2 in the dummy area 2 forming the second dummy pixel line in a second half vertical blank period.

The two vertical blank periods, that is, the first half vertical blank period and the second half vertical blank period can have the same length, but are not necessarily limited thereto, and can have different lengths as necessary.

The signal transmission units ST(1), . . . , and ST(N) can apply gate signals to the plurality of first pixel circuits 101-1 connected to gate lines. The signal transmission units ST(1), . . . , and ST(N) can be disposed at a left side portion or right side portion of a pixel array.

FIG. 17 is a view illustrating a schematic structure of a display panel according to a fourth embodiment of the present disclosure, and FIG. 18 is a waveform diagram illustrating a signal applied to a pixel in the display panel shown in FIG. 17.

Referring to FIG. 17, a display panel according to a fourth embodiment of the present disclosure can include a plurality of first pixel circuits 101-1, a plurality of second pixel circuits 101-2, and a gate driver 120 including a shift register composed of a plurality of signal transmission units ST(1), . . . , and ST(N) and a plurality of dummy signal transmission units DST1 and DST2, wherein the signal transmission unit ST(1) is configured to receive a first start pulse VST1, and the dummy signal transmission unit DST (1) is configured to receive a second start pulse VST2.

The plurality of first pixel circuits 101-1 can be disposed in an active pixel area where an input image is displayed. The first pixel circuit 101-1 can be implemented as the pixel circuit shown in FIG. 3.

The plurality of second pixel circuits 101-2 can be disposed in a dummy pixel area adjacent to the active pixel area. The dummy pixel area can be formed at an upper end portion or a lower end portion of the active pixel area. The second pixel circuit 101-2 can be implemented as a pixel circuit that is a different type of circuit than the first pixel circuit 101-1, but is not limited thereto, and can be implemented as the same type of pixel circuit as the first pixel circuit 101-1, and in addition, can be implemented as a circuit capable of causing a short circuit between a reference voltage line and a first power line.

The plurality of second pixel circuits 101-2 can be connected to one dummy gate line to form one dummy pixel line. In this situation, the plurality of second pixel circuits 101-2 forming the one dummy pixel line can be implemented as a pixel circuit having a horizontal resolution.

The plurality of signal transmission units ST(1), . . . , and ST(N) can apply gate signals to the plurality of first pixel circuits 101-1 connected to gate lines. The signal transmission units ST can be disposed at a left side portion or right side portion of a pixel array.

The plurality of dummy signal transmission units DST(1) and DST(2) are driven independently of the signal transmission units ST and can apply a first dummy signal SCAN DMY1 and a second dummy signal SCAN DMY2 to the plurality of second pixel circuits 101-2 connected to the dummy gate line, respectively.

As shown in FIG. 18, a gate-low voltage of the first dummy signal SCAN DMY1 can be applied to the pixel circuits 101-2 in the dummy area 1 forming a first dummy pixel line in a first half vertical blank period, and a gate-low voltage of the second dummy signal SCAN DMY2 can be applied to the pixel circuits 101-2 in the dummy area 2 forming a second dummy pixel line in a second half vertical blank period.

The two vertical blank periods, that is, the first half vertical blank period and the second half vertical blank period can have the same length, but are not necessarily limited thereto, and can have different lengths as necessary.

The signal transmission units ST can apply gate signals to the plurality of first pixel circuits 101-1 connected to gate lines. The signal transmission units ST can be disposed at a left side portion or right side portion of a pixel array.

A first dummy signal transmission unit DST(1) and a second dummy signal transmission unit DST(2) are driven independently of the signal transmission units ST and can apply a first dummy signal SCAN DMY1 and a second dummy signal SCAN DMY2 to the plurality of second pixel circuits 101-2 connected to the dummy gate line, respectively.

FIGS. 19A to 19C are views illustrating various forms of dummy signals according to the embodiment.

Referring to FIG. 19A, in an embodiment, a pulse width of the dummy signal can be changed according to an amount of current flowing when a short circuit occurs between a reference voltage line of the second pixel circuit and a first power line.

For example, when a current flowing through the first pixel circuit is 1 A and a current flowing through the second pixel circuit is 1 A, the pulse width of the dummy signal can be set equal to the vertical blank period.

Referring to FIG. 19B, when the current flowing through the first pixel circuit is 1 A and the current flowing through the second pixel circuit is 2 A, since a magnitude of the current flowing through the second pixel circuit is twice a magnitude of the current flowing through the first pixel circuit, a duty ratio of the dummy signal can be set to 50%. In this situation, the pulse form of the dummy signal can be any form as long as the duty ratio of the dummy signal is satisfied. In other words, the duty ratio of the dummy signal can be dynamically changed in order to match the amount of current drawn by a short circuit between a reference voltage line and a first power line in the first pixel circuit 1A during the vertical active period.

Referring to FIG. 19C, in two dummy pixel lines, the sum of the pulse widths of the dummy signals applied to each dummy pixel line can be set equal to the vertical blank period.

For example, the duty ratio of the first dummy signal and the second dummy signal can be set to 50%, and the pulse width of the first dummy signal and the pulse width of the second dummy signal can be set the same. Further, the pulse width of the first dummy signal can also be set to be greater than or smaller than the pulse width of the second dummy signal.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display panel comprising:

a plurality of first pixel circuits configured to receive a pixel driving voltage and a reference voltage for displaying an image; and a plurality of second pixel circuits including a power line supplied with the pixel driving voltage and a reference voltage line supplied with the reference voltage, wherein the plurality of first pixel circuits are configured to short-circuit the power line to the reference voltage line for at least some amount of time within a vertical active period, and the plurality of second pixel circuits are configured to short-circuit the power line to the reference voltage line for at least some amount of time within a vertical blank period.

2. The display panel of claim 1, wherein the plurality of second pixel circuits are dummy circuits that are not used for displaying the image, and wherein the plurality of second pixel circuits are configured to maintain uniform luminance of the plurality of first pixel circuits.

3. The display panel of claim 1, wherein each of the plurality of first pixel circuits includes:

a (1-1)th driving element including a first electrode connected to the power line supplying the pixel driving voltage, a gate electrode connected to a first node, and a second electrode connected to a second node;

a (1-1)th switch element including a first electrode connected to the second node, a gate electrode configured to receive a light emission control (EM) signal, and a second electrode connected to a third node;

a (1-2)th switch element including a first electrode connected to the first node, a gate electrode configured to receive a first scan signal, and a second electrode connected to the second node;

a (1-3)th switch element including a first electrode configured to receive a data voltage, a gate electrode configured to receive a second scan signal, and a second electrode connected to a fourth node;

a (1-4)th switch element including a first electrode configured to receive the reference voltage, a gate electrode configured to receive the first scan signal, and a second electrode connected to the third node;

a (1-5)th switch element including a first electrode connected to the fourth node, a gate electrode configured to receive the EM signal, and a second electrode configured to receive the reference voltage;

a (1-1)th light-emitting element connected between the third node and a low power voltage line configured to receive a low-potential voltage; and a (1-1)th capacitor connected between the first node and the second node.

4. The display panel of claim 3, wherein each of the plurality of second pixel circuits includes:

a (2-1)th driving element including a first electrode connected to the power line supplied with the pixel driving voltage, and a gate electrode and a second electrode connected to each other; and a (2-1)th switch element including a first electrode connected to the (2-1)th driving element, a gate electrode configured to receive a dummy signal, and a second electrode connected to the reference voltage line.

5. The display panel of claim 4, wherein:

the plurality of second pixel circuits include a (2-1)th pixel circuit disposed in a first dummy area and a (2-2)th pixel circuit disposed in a second dummy area; and the (2-1)th pixel circuit and the (2-2)th pixel circuit are alternately driven at a predetermined duty ratio during the vertical blank period.

6. The display panel of claim 5, wherein the duty ratio is adjusted based on an amount of current flowing through a short-circuit between the power line and the reference voltage line in at least one of the plurality of first pixel circuits during a vertical active period.

7. The display panel of claim 4, further comprising a plurality of signal transmission units configured to supply gate signals to the plurality of first pixel circuits, wherein the gate signals include the EM signal, the first scan signal, and the second scan signal.

8. The display panel of claim 7, further comprising a dummy signal transmission unit configured to supply the dummy signal to the plurality of second pixel circuits.

9. The display panel of claim 3, wherein each of the plurality of second pixel circuits includes:

a (2-1)th driving element including a first electrode connected to the power line, a gate electrode connected to a first node, and a second electrode connected to a second node;

a (2-1)th switch element including a first electrode connected to the second node, a gate electrode configured to receive a dummy signal, and a second electrode connected to a third node;

a (2-2)th switch element including a first electrode connected to the first node, a gate electrode configured to receive the dummy signal, and a second electrode connected to the second node;

a (2-3)th switch element including a first electrode configured to receive a data voltage, a gate electrode configured to receive the second scan signal, and a second electrode connected to a fourth node;

a (2-4)th switch element including a first electrode configured to receive the reference voltage, a gate electrode configured to receive the dummy signal, and a second electrode connected to the third node;

a (2-5)th switch element including a first electrode connected to the fourth node, a gate electrode configured to receive the dummy signal, and a second electrode configured to receive the reference voltage;

a (2-1)th light-emitting element connected between the third node and the low power voltage line; and a (2-1)th capacitor connected between the first node and the second node.

10. The display panel of claim 9, wherein the plurality of second pixel circuits include:

a (2-1)th pixel circuit disposed in a first dummy area and a (2-2)th pixel circuit disposed in a second dummy area, wherein the (2-1)th pixel circuit and the (2-2)th pixel circuit are alternately driven at a predetermined duty ratio during the vertical blank period.

11. The display panel of claim 10, wherein the duty ratio is adjusted based on an amount of current flowing through a short-circuit between the power line and the reference voltage line in at least one of the plurality of first pixel circuits during a vertical active period.

12. The display panel of claim 9, further comprising a plurality of signal transmission units configured to apply gate signals to the plurality of first pixel circuits, wherein the gate signals include the EM signal, the first scan signal, and the second scan signal.

13. The display panel of claim 12, further comprising a dummy signal transmission unit configured to supply the dummy signal to the plurality of second pixel circuits.

14. A display device comprising:

a display panel including:

a plurality of data lines, a plurality of gate lines crossing the data lines, power lines configured to receive different voltages, a plurality of first pixel circuits configured to receive a pixel driving voltage and a reference voltage from the power lines, and a plurality of second pixel circuits including a power line supplied with the pixel driving voltage and a reference voltage line supplied with the reference voltage, wherein the plurality of first pixel circuits are configured to short-circuit the power line to the reference voltage line for at least some amount of time within a vertical active period, and at least one of the plurality of second pixel circuits is configured to short-circuit the power line to the reference line for at least some amount time within a vertical blank period;

a data driver configured to supply a data voltage to the plurality of data lines; and a gate driver configured to supply a gate signal to the plurality of gate lines.

15. The display device of claim 14, wherein each of the plurality of first pixel circuits includes:

a (1-1)th driving element including a first electrode connected to the power line, a gate electrode connected to a first node, and a second electrode connected to a second node;

a (1-1)th switch element including a first electrode connected to the second node, a gate electrode configured to receive a light emission control (EM) signal, and a second electrode connected to a third node;

a (1-2)th switch element including a first electrode connected to the first node, a gate electrode configured to receive a first scan signal, and a second electrode connected to the second node;

a (1-3)th switch element including a first electrode configured to receive a data voltage, a gate electrode configured to receive a second scan signal, and a second electrode connected to a fourth node;

a (1-4)th switch element including a first electrode configured to receive the reference voltage, a gate electrode configured to receive the first scan signal, and a second electrode connected to the third node;

a (1-5)th switch element including a first electrode connected to the fourth node, a gate electrode configured to receive the EM signal, and a second electrode configured to receive the reference voltage;

a (1-1)th light-emitting element connected between the third node and a low power voltage line configured to receive a low-potential voltage; and a (1-1)th capacitor connected between the first node and the second node.

16. The display device of claim 15, wherein each of the plurality of second pixel circuits includes:

a (2-1)th driving element including a first electrode connected to the power line, and a gate electrode and a second electrode connected to each other; and a (2-1)th switch element including a first electrode connected to (2-1)th driving element, a gate electrode configured to receive a dummy signal, and a second electrode connected to the reference voltage line.

17. The display device of claim 15, further comprising a plurality of signal transmission units configured to apply gate signals to the plurality of first pixel circuits, wherein the gate signals include the EM signal, the first scan signal, and the second scan signal.

18. The display device of claim 17, further comprising a dummy signal transmission unit configured to apply a dummy signal to the plurality of second pixel circuits.

19. The display device of claim 15, wherein each of the plurality of second pixel circuits includes:

a (2-1)th driving element including a first electrode connected to the power line, a gate electrode connected to a first node, and a second electrode connected to a second node;

a (2-1)th switch element including a first electrode connected to the second node, a gate electrode configured to receive a dummy signal, and a second electrode connected to a third node;

a (2-2)th switch element including a first electrode connected to the first node, a gate electrode configured to receive the dummy signal, and a second electrode connected to the second node;

a (2-3)th switch element including a first electrode configured to receive a data voltage, a gate electrode configured to receive the second scan signal, and a second electrode connected to a fourth node;

a (2-4)th switch element including a first electrode configured to receive the reference voltage, a gate electrode configured to receive the dummy signal, and a second electrode connected to the third node;

a (2-5)th switch element including a first electrode connected to the fourth node, a gate electrode configured to receive the dummy signal, and a second electrode configured to receive the reference voltage;

a (2-1)th light-emitting element connected between the third node and the low power voltage line; and a (2-1)th capacitor connected between the first node and the second node.

20. The display device of claim 19, further comprising a plurality of signal transmission units configured to apply gate signals to the plurality of first pixel circuits, wherein the gate signals include the EM signal, the first scan signal, and the second scan signal.

21. The display device of claim 20, further comprising a dummy signal transmission unit configured to apply the dummy signal to the plurality of second pixel circuits.

22. A display panel comprising:

a first type of pixel circuit connected to a power line and a reference voltage line, the first type of pixel circuit being configured to display an image; and a second type of pixel circuit connected to the power line and the reference voltage line, the second type of pixel circuit being configured as a dummy pixel circuit that does not display an image, wherein, the first type of pixel circuit includes at least one switch configured to connect the reference voltage line with the power line for at least some amount of time within a vertical active period to cause a short circuit, and the second type of pixel circuit includes at least one switch configured to connect the reference voltage line with the power line for at least some amount of time within a vertical black period to cause a short circuit.

23. The display panel of claim 22, further comprising:

a plurality of pixel rows including a plurality of pixels, each of the plurality of pixels including the first type of pixel circuit; and at least one row of dummy circuits, each of the dummy circuits including the second type of pixel circuit, wherein the at least one row of dummy circuits is disposed adjacent to a first row of pixels among the plurality of pixel rows or adjacent to a last row of pixels among the plurality of pixel rows.

* * * * *